(12) United States Patent
Lee et al.

(10) Patent No.: US 9,706,498 B2
(45) Date of Patent: Jul. 11, 2017

(54) METHOD FOR CONTROLLING TRANSMISSION POWER IN A WIRELESS ACCESS SYSTEM AND APPARATUS FOR SAME

(75) Inventors: Sangwook Lee, Anyang-si (KR); Manyoung Jung, Anyang-si (KR); Byongyol Lee, Anyang-si (KR); Yoonoh Yang, Anyang-si (KR); Suhwan Lim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 294 days.

(21) Appl. No.: 14/118,125

(22) PCT Filed: Jun. 20, 2012

(86) PCT No.: PCT/KK2012/004871
§ 371 (c)(1),
(2), (4) Date: Nov. 15, 2013

(87) PCT Pub. No.: WO2012/177045
PCT Pub. Date: Dec. 27, 2012

(65) Prior Publication Data
US 2014/0071933 A1 Mar. 13, 2014

Related U.S. Application Data

(60) Provisional application No. 61/498,639, filed on Jun. 20, 2011.

(51) Int. Cl.
*H04W 52/04* (2009.01)
*H04W 52/36* (2009.01)
(Continued)

(52) U.S. Cl.
CPC ........ *H04W 52/04* (2013.01); *H04W 52/367* (2013.01); *H04W 52/243* (2013.01); *H04W 52/281* (2013.01)

(58) Field of Classification Search
CPC . H04W 52/04; H04W 52/367; H04W 52/281; H04W 52/243
See application file for complete search history.

(56) References Cited

U.S. PATENT DOCUMENTS

2009/0197627 A1  8/2009 Kuffner et al.
2010/0048234 A1*  2/2010 Singh ............... H04W 4/20
                                                      455/509
(Continued)

FOREIGN PATENT DOCUMENTS

KR  10-2010-0117099 A  11/2010
KR  10-2010-0118958 A  11/2010
WO  WO 2010/094482 A1  8/2010

*Primary Examiner* — Christopher Grey
(74) *Attorney, Agent, or Firm* — Birch, Stewart, Kolasch & Birch, LLP

(57) ABSTRACT

The present invention relates to a method for controlling transmission power in a wireless access system that supports an operation in an unlicensed band, and to an apparatus for same. More particularly, the method for controlling the transmission power of a terminal in a wireless access system that supports a TV white space (TV WS) band comprises the steps of: allocating, to a terminal, an available frequency band which is not used by a licensed device from among the TV WS band; calculating, if a receiving band of another device exists in a band adjacent to the available frequency band, the maximum transmission power value of the terminal based on a level of interference which will not affect the reception of another device; and transmitting, to the terminal, transmission power control information for correcting the transmission power of the terminal on the basis of the maximum transmission power value.

15 Claims, 18 Drawing Sheets

(51) Int. Cl.
 *H04W 52/24* (2009.01)
 *H04W 52/28* (2009.01)

(56) References Cited

U.S. PATENT DOCUMENTS

| | | | | |
|---|---|---|---|---|
| 2010/0208685 | A1* | 8/2010 | Kim | H04W 52/245 370/329 |
| 2010/0273515 | A1* | 10/2010 | Fabien et al. | 455/509 |
| 2011/0228666 | A1* | 9/2011 | Barbieri | H04W 76/023 370/216 |
| 2011/0299479 | A1* | 12/2011 | Deb | H04W 28/18 370/329 |
| 2011/0300891 | A1* | 12/2011 | Deb | H04J 11/0023 455/510 |
| 2012/0044898 | A1* | 2/2012 | Ishii | H04W 52/146 370/329 |
| 2012/0052891 | A1* | 3/2012 | Irnich | H04W 52/243 455/501 |
| 2012/0100883 | A1 | 4/2012 | Hwang et al. | |
| 2012/0176998 | A1* | 7/2012 | Muellner | H04W 52/343 370/329 |
| 2012/0231834 | A1* | 9/2012 | Seo et al. | 455/522 |
| 2013/0034091 | A1* | 2/2013 | Kim et al. | 370/338 |
| 2013/0044662 | A1* | 2/2013 | Kwon | H04L 1/1864 370/311 |
| 2013/0343219 | A1* | 12/2013 | Kronander | H04W 52/243 370/252 |
| 2014/0080501 | A1* | 3/2014 | Lee | H04W 72/0453 455/454 |
| 2014/0086195 | A1* | 3/2014 | Jung | H04W 52/367 370/329 |
| 2015/0087352 | A1* | 3/2015 | Lim | H04W 72/0453 455/522 |

* cited by examiner

FIG. 12
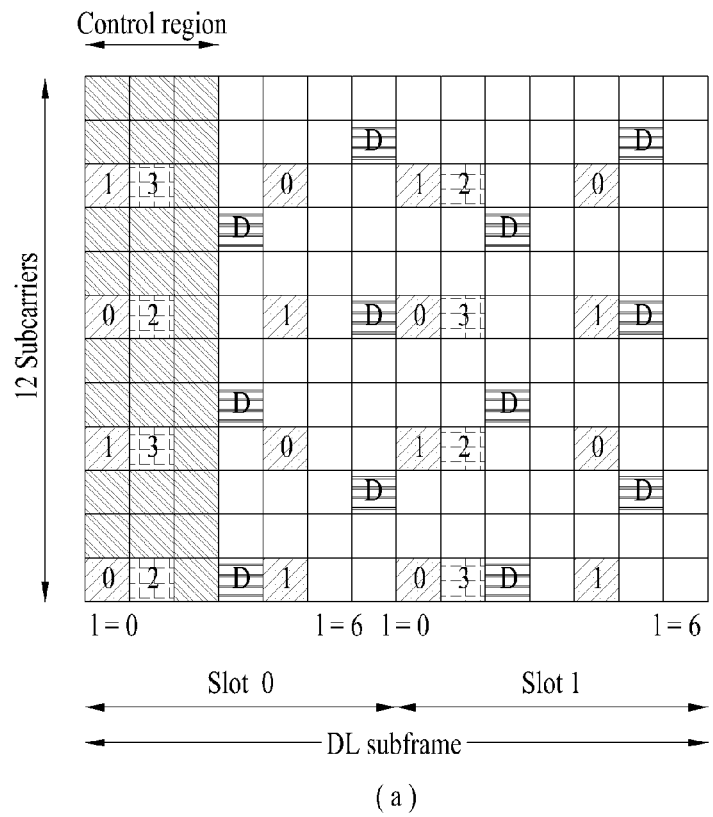
(a)
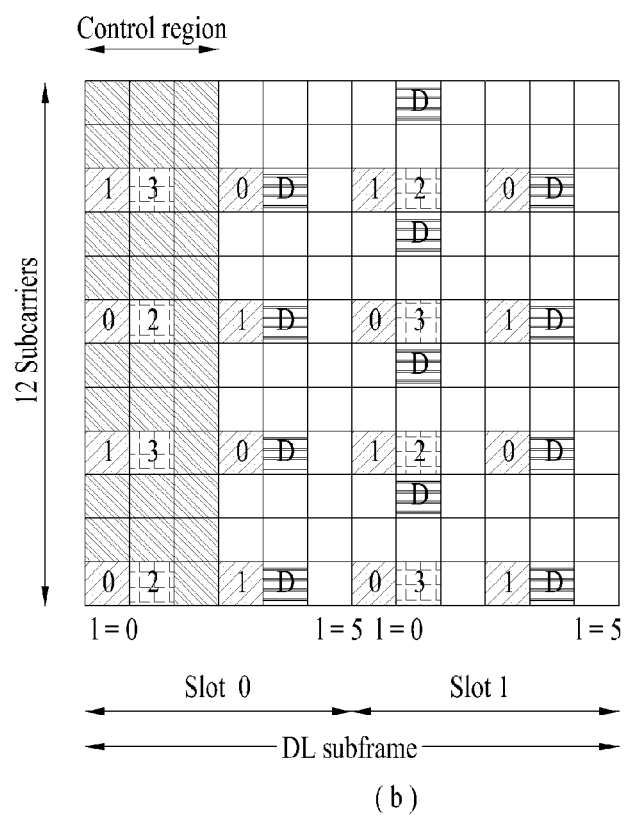
(b)

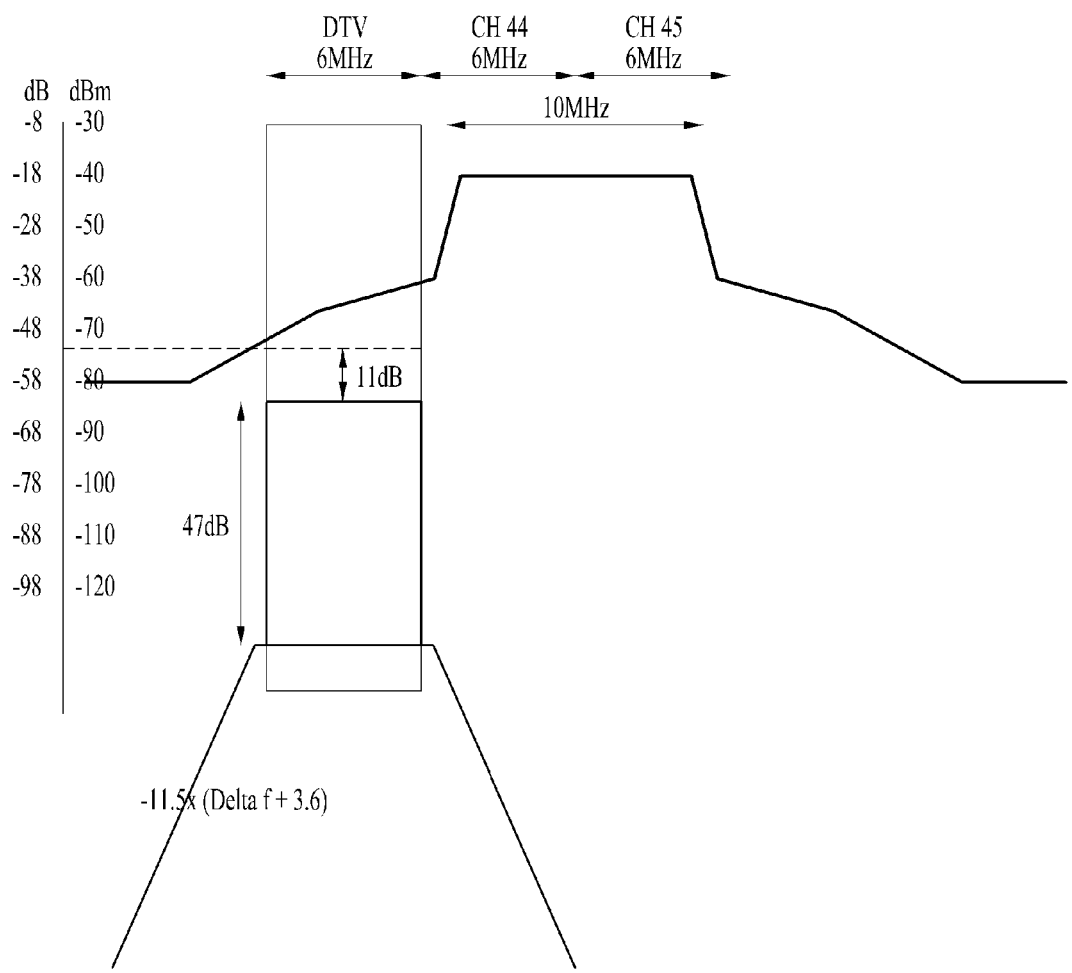

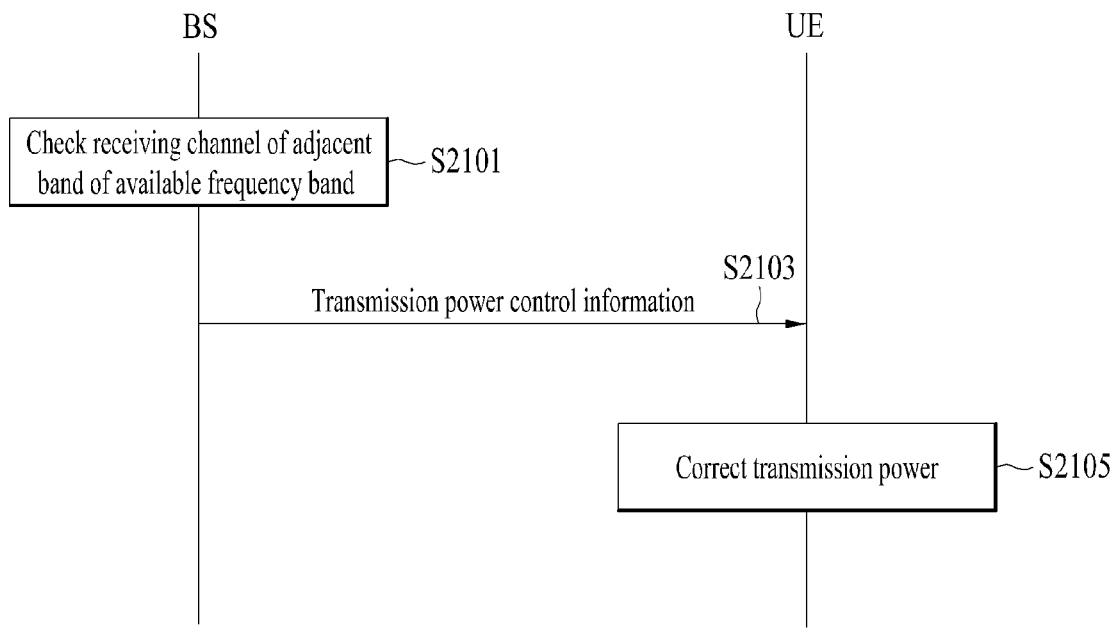
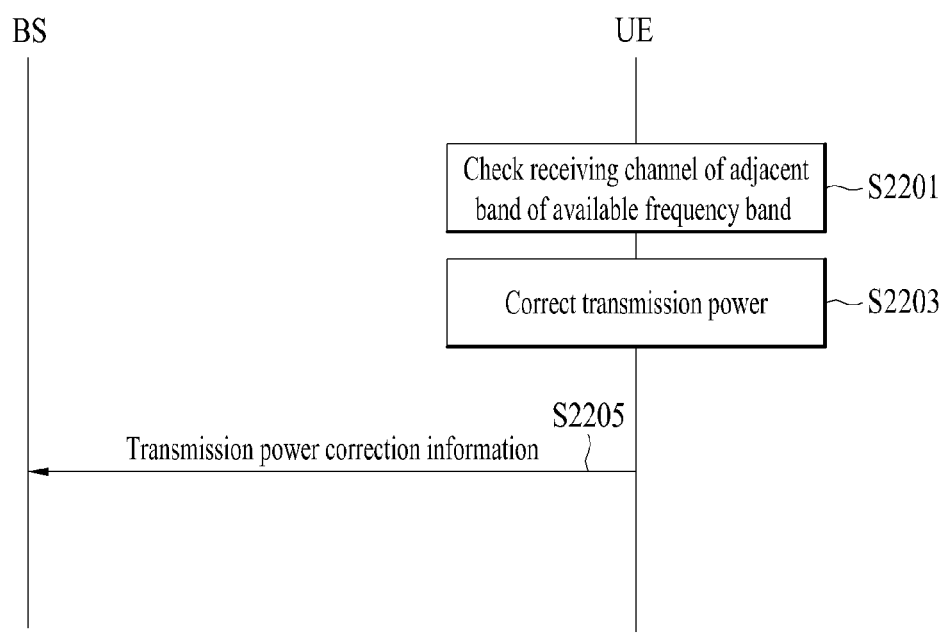

METHOD FOR CONTROLLING TRANSMISSION POWER IN A WIRELESS ACCESS SYSTEM AND APPARATUS FOR SAME

This application is the National Phase of PCT/KR2012/004871 filed on Jun. 20, 2012, which claims priority under 35 U.S.C. 119(e) to U.S. Provisional Application No. 61/498,639 filed on Jun. 20, 2011, all of which are hereby expressly incorporated by reference into the present application.

TECHNICAL FIELD

The present invention relates to a wireless access system, and more particularly, to a method of controlling a transmission power of a user equipment in a wireless access system supportive of an operation on an unlicensed band and apparatus for supporting the same.

BACKGROUND ART

The standard for WLAN (wireless local area network) technology is being developed as IEEE (institute of electrical and electronics engineers) 802.11 standard. IEEE 802.11a/b uses an unlicensed band on 2.4 or 5 GHz. The IEEE 802.11b provides a data rate of 11 Mbps, while the IEEE 802.11a provides a data rate of 54 Mbps. IEEE 802.11g applies OFDM (orthogonal frequency division multiplexing) on 2.4 GHz to provide a data rate of 54 Mbps. IEEE 802.11n applies MIMO-OFDM (multiple input multiple output-OFDM) to provide a data rate of 300 Mbps for 4 spatial streams. The IEEE 802.11n supports channel bandwidths up to 40 MHz. In this case, a data rate of 600 Mbps is provided.

Meanwhile, a TV white space (TV WS) is a frequency assigned to a broadcast TV, includes a UHF (ultra high frequency) band and a VHF (very high frequency) band, and means the frequency bands allowed to be used for an unlicensed device under the condition that communications of a licensed device operating on the corresponding frequency bands are not interrupted. In particular, a device operating as an unlicensed device can use an available channel or frequency band currently not used by a licensed device on the corresponding frequency band. In this case, the licensed device may include one of a TV, a wireless microphone and the like. And, the licensed device may be called a licensed user, an incumbent user, a primary user or the like.

An unlicensed device desiring to use the TV WS band should provide a protective function for a licensed device. Hence, before starting a transmission of a signal on the TV WS band, it is mandatory for the unlicensed device to check whether a licensed device occupies the corresponding band in order to obtain available channel information.

To this end, the unlicensed device may check whether the corresponding band is used by a licensed device by performing a spectrum sensing. Spectrum sensing mechanism may include one of energy detection, feature detection and the like. If a strength of a signal received on a specific channel is equal to or greater than a predetermined value or a DTV (digital TV) preamble is detected, the unlicensed device can determine that the licensed device is currently using the specific channel. If it is determined that a licensed device is using a channel right adjacent to a currently used channel, a transmission power of an unlicensed device may be lowered depending on a level of an interference radiating into an adjacent band.

Yet, in case that an unlicensed device depends on a frequency sensing only to obtain available channel information from TV WS band, a burden due to a sensing for an operation on the TV WS band is further put on the unlicensed device and a corresponding procedure may be delayed. Hence, the unlicensed device accesses a geo-location database through Internet or a dedicated network and is then able to obtain channel list information on a list of channels available in a corresponding area. In this case, the geo-location database is configured to store and manage information on registered licensed devices and channel usage information on a channel dynamically changing depending on geo-locations and channel used times of the licensed devices.

DISCLOSURE OF THE INVENTION

Technical Tasks

One object of the present invention is to propose a method of controlling a transmission power of a user equipment operating as an unlicensed device in a wireless access system, and more particularly, in a wireless access system supportive of an operation on an unlicensed band and an apparatus therefor.

Another object of the present invention is to provide a method of minimizing an adjacent band leakage interference due to a power emitted out of an available frequency band by a user equipment operating on the available frequency band of an unlicensed band and apparatus therefor.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

In an aspect of the present invention, disclosed herein is a method for controlling a transmission power of a user equipment in a wireless access system supportive of a TV white space (TV WS) band, the method comprising assigning to the user equipment an available frequency band unused by a licensed device in the TV WS band, calculating a maximum transmission power value of the user equipment based on a level of interference which does not affect receiving by another device when a receiving band of the another device exists on an adjacent band of the available frequency band, and transmitting, to the user equipment, transmission power control information for correcting a transmission power of the user equipment based on the maximum transmission power value.

In another aspect of the present invention, disclosed herein is a base station in a wireless access system supportive of a TV white space (TV WS) band, the base station comprising a RF (radio frequency) unit configured to transceive a wireless signal; and a processor assigning, to a user equipment, an available frequency band unused by a licensed device in the TV WS band, calculating a maximum transmission power value of the user equipment based on a level of interference which does not affect receiving by another device when a receiving band of the another device exists on an adjacent band of the available frequency band, and transmitting, to the user equipment, transmission power control information for correcting a transmission power of the user equipment based on the maximum transmission power value.

Preferably, the method further comprises receiving, from the user equipment or a network, information indicating whether the receiving band of the another device exists on the adjacent band.

Preferably, the method further comprises determining whether the receiving band of the another device exists on the adjacent band, through usage information of the TV WS band shared with another base station.

Preferably, the transmission power control information includes A-MPR (Additional Maximum Power Reduction).

In a still another aspect of the present invention, disclosed herein is a method for controlling a transmission power of a user equipment in a wireless access system supportive of a TV white space (TV WS) band, the method comprising calculating a maximum transmission power value of the user equipment based on a level of interference which does not affect receiving by another device, when a receiving band of the another device exists on an adjacent band of a frequency band assigned by a base station; and transmitting, to the user equipment, transmission power correction information indicating the calculated maximum transmission power value, wherein the assigned frequency band corresponds to an available frequency band unused by a licensed device in the TV WS band.

In a still another aspect of the present invention, disclosed herein is a user equipment in a wireless access system supportive of a TV white space (TV WS) band, the user equipment comprising a RF (radio frequency) unit configured to transceive a wireless signal; and a processor calculating a maximum transmission power value of the user equipment based on a level of interference which does not affect receiving by another device receiving by another, and transmitting, to the user equipment, transmission power correction information indicating the calculated maximum transmission power value, wherein the assigned frequency band corresponds to an available frequency band unused by a licensed device in the TV WS band.

Preferably, the method further comprises determining whether the receiving band of the another device exists on the adjacent band by performing a frequency scan on the adjacent band.

Preferably, the method further comprises receiving, from the base station, information indicating whether the receiving band of the another devi ce exists on the adjacent band.

Preferably, the maximum transmission power value is calculated in consideration of performance of a RF (radio frequency) unit of the user equipment.

Advantageous Effects

According to an embodiment of the present invention, it is able to efficiently control a transmission power of a user equipment operating as an unlicensed device in a wireless access system, and more particularly, in a wireless access system supportive of an operation on an unlicensed band.

According to an embodiment of the present invention, it is able to minimize an adjacent band leakage interference band due to a power emitted out of an available frequency band in a manner of controlling a transmission power of a user equipment operating on the available frequency band of an unlicensed band.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, are incorporated in and constitute a part of this application, illustrate embodiment(s) of the invention and together with the description serve to explain the principle of the invention.

FIG. 12 is a diagram of a reference signal pattern mapped to a downlink resource block (RB) pair defined in 3GPP LTE system.

FIG. 20 is a diagram for one example of influence on DTV reception due to wireless LAN or LTE-LTE-A user equipment transmission ACLR, DTV reception ACS and the like.

FIG. 21 is a diagram for one example of a method of controlling a transmission power of a user equipment to minimize interference emitted to an adjacent band according to one embodiment of the present invention.

FIG. 22 is a diagram for one example of a method of controlling a transmission power of a user equipment to minimize interference emitted to an adjacent band according to one embodiment of the present invention.

BEST MODE FOR INVENTION

Figure 1:
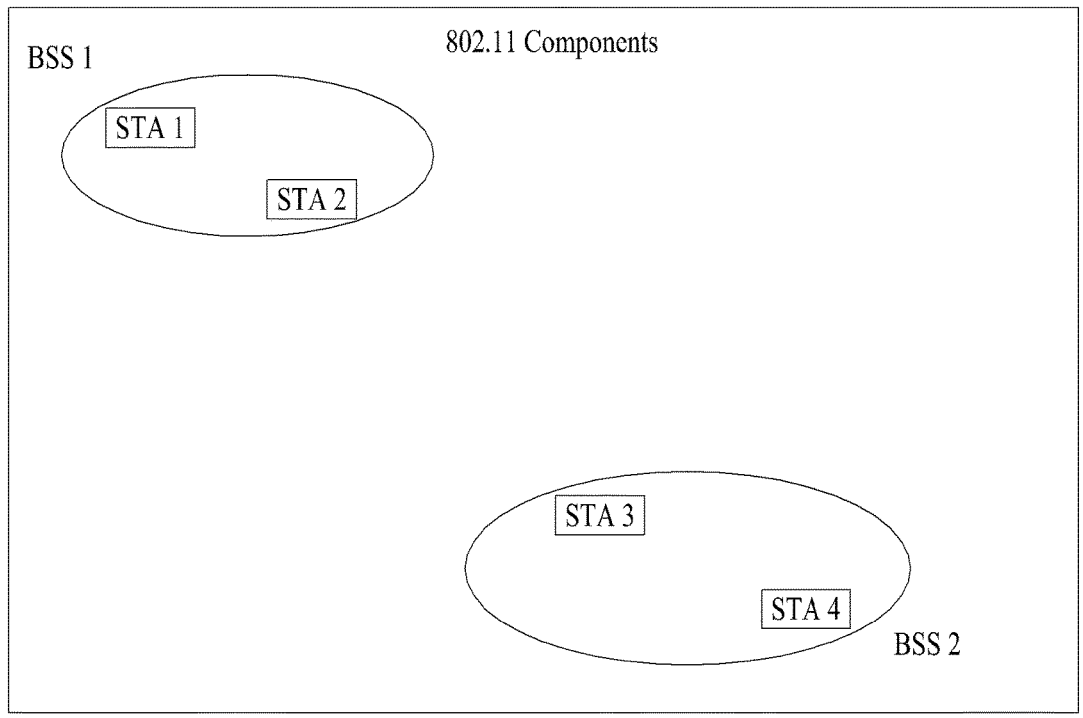
FIG. 1 is a diagram for one example of a configuration of a wireless LAN system.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS), a station (STA) and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

In the present specification, a transmission power can be represented by a linear scale or a dB scale. Moreover, an operation according to an embodiment of the present invention may be performed in a power domain or an amplitude domain.

1. The General of Wireless LAN (WLAN) System to which the Present Invention is Applicable FIG. 1 is a diagram for one example of a configuration of a wireless LAN system.

Referring to FIG. 1, a wireless LAN system includes at least one basic service set (BSS). The BSS is a set of stations (STAs) capable of communicating with each other by being successfully synchronized together. In FIG. 1, 2 BSSs and 2 STAs having accesses each of the BSSs are exemplarily shown. A notation of an oval shape in FIG. 1 indicates a coverage area of the BSS, which is called a basic service area (BSA). If the STA moves over the BSA, the corresponding STA is unable to directly communicate with another STA existing in the BSA.

The BSS is categorized into an independent BSS (IBSS) and an infrastructure BSS. The IBBS is a most basic type of a wireless LAN system. In FIG. 1, IBBS is shown. In the IBBS, STA can communicate with each other in direct. And, a type of such an inter-STA operation is called an ad hoc network.

In order to access BSS, an STA should perform a procedure for synchronization with a base station. In order to access all services of the infrastructure BSS, an STA should be associated with a base station. Such an association procedure is dynamically performed and includes a use of a distribution system service (DSS).

Figure 2:
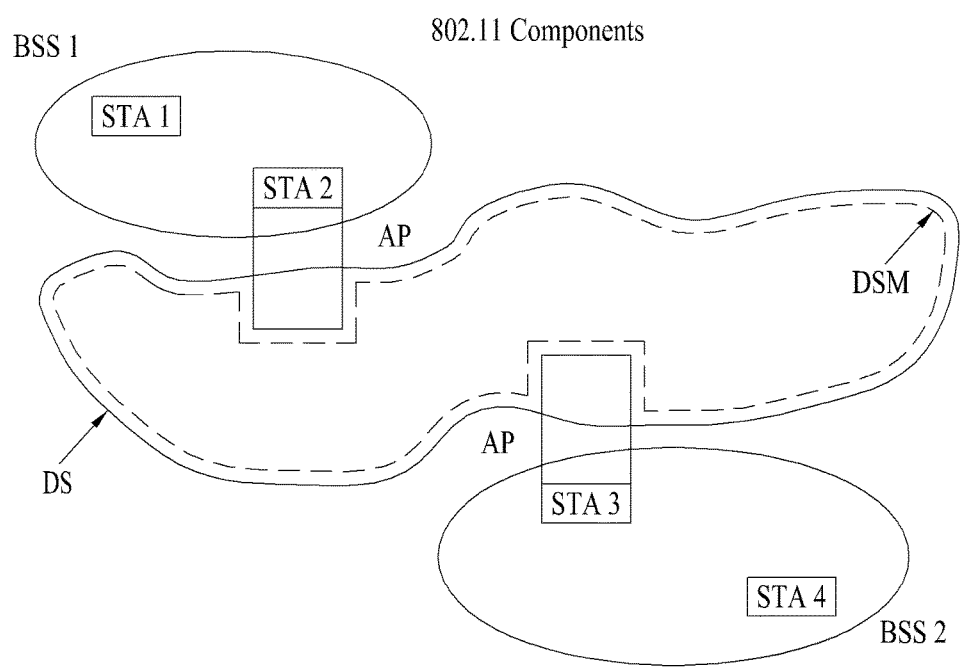
FIG. 2 is a diagram for another example of a configuration of a wireless LAN system.

FIG. 2 is a diagram for another example of a configuration of a wireless LAN system.

A direct distance supportable between STA and STA may be physically restricted. Such a distance may be sufficient depending on a network. Yet, if such a distance is not sufficient, an extension of a coverage may be required. Hence, BSS may be configured as one component in an extended type of a network configured with a plurality of BSSs. Thus, an architecture component used to mutually connect BSSs to each other is called a distribution system (DS).

The DS is a mechanism for connecting a plurality of APs. It may be unnecessary for the DS to be a network. If the DS is able to provide a prescribed distribution service, no restriction is put on a type of the DS. For instance, the DS may be such a wireless network as a mesh network or a physical structure for connecting APs to each other.

In a wireless LAN system, a distribution system medium (DSM) and a wireless medium (WM) can be logically discriminated from each other. Each logical medium is used for different purpose by a different component of architecture. As DS provides a logical service required for the seamless integration of a plurality of BSSs and the management of an address mapping to a destination, mobility of a device can be supported.

An access point (AP) is an entity that supports an associated STA to access a distribution system through WM. DATA is transported between BSS and DS through the AP. In this case, since every AP can become STA, the AP is an entity having an address as well. Yet, an address used by AP for a communication through WM and an address used by AP for a communication through DSM do not need to be identical to each other.

Figure 3:
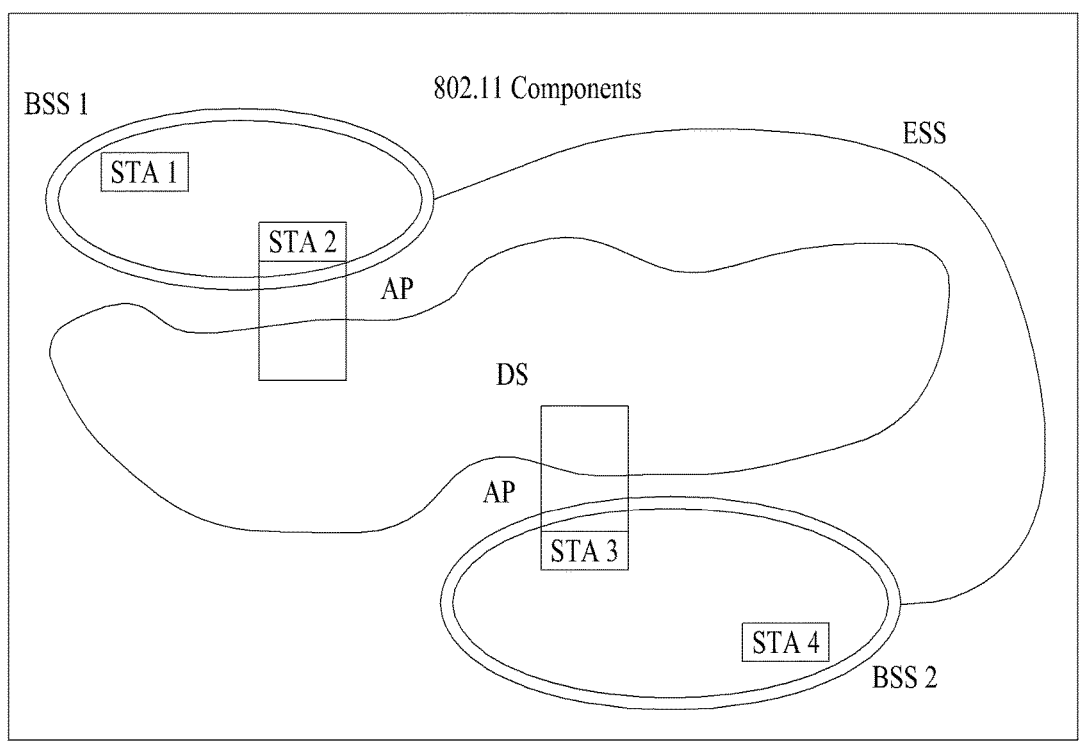
FIG. 3 is a diagram for a further example of a configuration of a wireless LAN system.

FIG. 3 is a diagram for a further example of a configuration of a wireless LAN system.

It is able to establish a wireless network having a random size and complexity using DS and BSS. And, such a network type is called an extended service set (ESS) network. The ESS means a plurality of BSSs connected to each other through DS but does not include the DS. Since the ESS network has the same logical link control (LLC) layer of an IBSS network, STA belonging to ESS can move away from one BSS into another BSS within the same ESS in a manner of being transparent to LLC.

In order to form a physically continuous coverage, BSSs may overlap each other in part. Since no limitation is put on a logical distance between BSSs, the BSSs may not be physically connected to each other. Moreover, in order to avoid unnecessary overlapping, BSSs may not be physically combined with each other. For the case that an ad hoc network operates at a location having an ESS network, the case that wireless system networks configured to physically overlap each other are configured in different structures, respectively, or the case that a plurality of different access or security policies are necessary at the same location, one (or more) IBSS or ESS network can exist as one (or more) ESS network in the physically same space.

Figure 4:
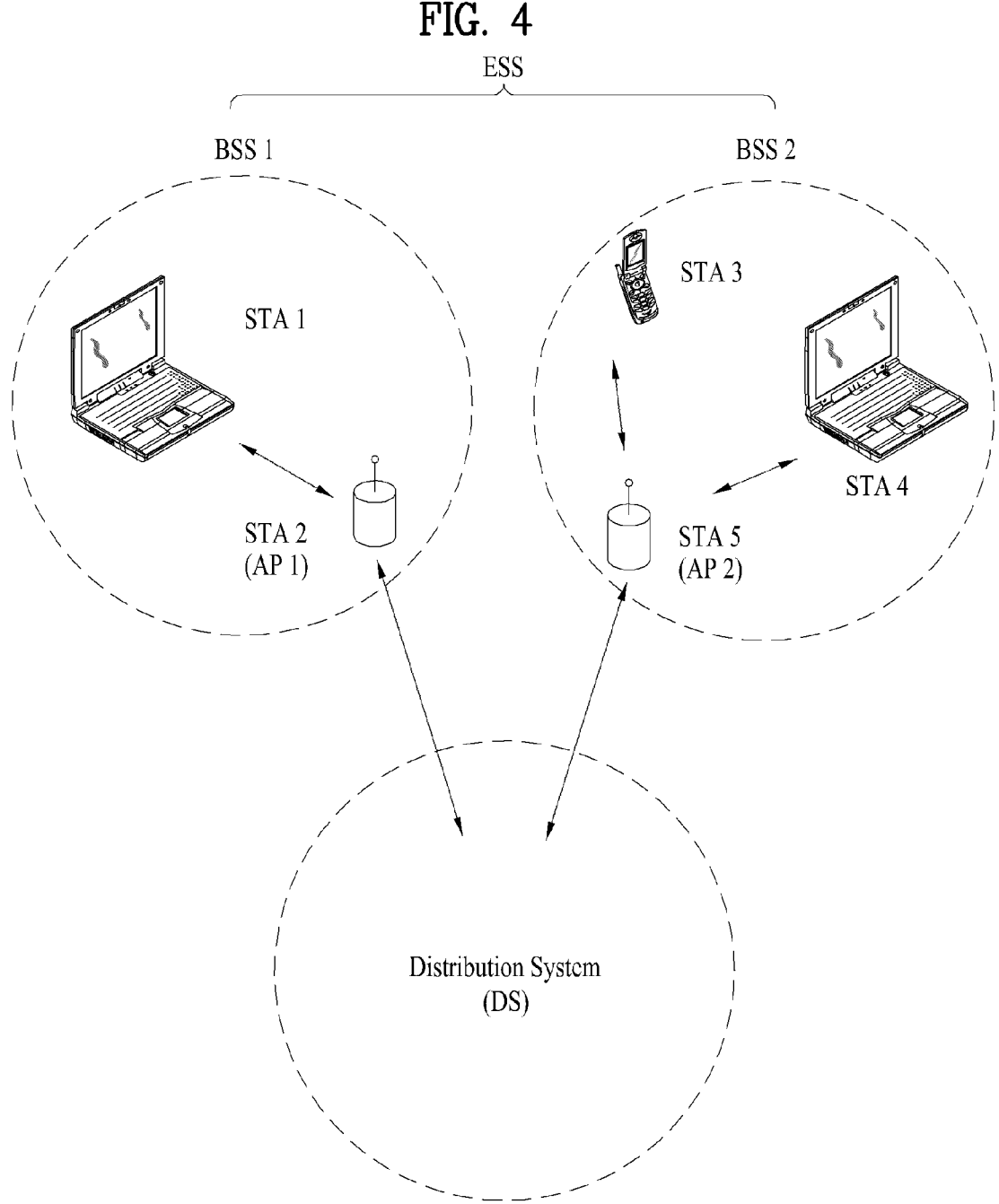
FIG. 4 is a diagram for another further example of a configuration of a wireless LAN system.

FIG. 4 is a diagram for another further example of a configuration of a wireless LAN system.

FIG. 4 shows one example of an infrastructure BSS including DS. In FIG. 4, ESS includes BSS 1 and BSS 2. STA is a logical entity that includes a physical layer interface for a medium access control (MAC) and a wireless medium and includes AP STA (AP station) and non-AP STA (non-AP station). Regarding STAs, a mobile user equipment manipulated by a user is a non-AP STA. If simply called an STA, it may indicate a non-AP STA. The non-AP STA may be called such a different name as a terminal, a wireless transmit/receive unit (WTRU), a user equipment (UE), a mobile station (MS), a mobile terminal, a mobile subscriber unit and the like. And, the AP is an entity that provides an STA (i.e., an associated station) associated with the AP with an access to a distribution system (DS) through a wireless medium. The AP may be called an integrated controller, a base station (BS), a Node-B, a base transceiver system (BTS), a femto BS, a site controller or the like.

Figure 5:
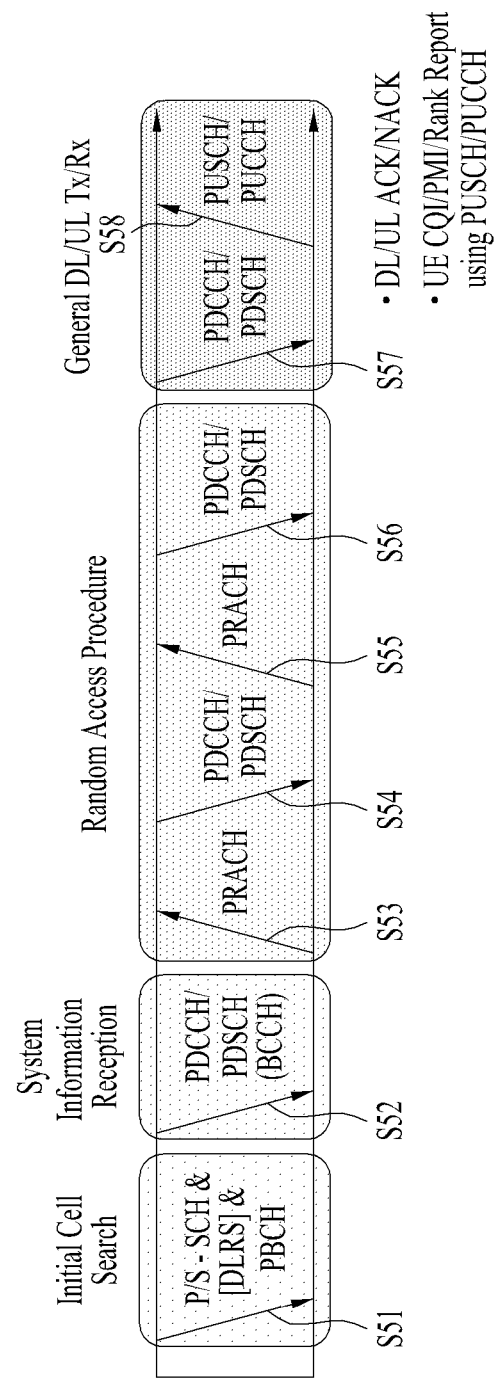
FIG. 5 is a diagram to describe physical channels used for 3GPP system and a signal transmission using the same.

2. 3GPP LTE/LTE-A System to which the Present Invention is Applicable 2.1. The General of System FIG. 5 is a diagram for explaining physical channels used for 3GPP system and a signal transmission using the same.

First of all, if a power of a user equipment is turned on or the user equipment enters a new cell, the user equipment may perform an initial cell search job for matching synchronization with a base station and the like [S51]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain detailed system information [S52].

Subsequently, the user equipment may perform a random access procedure to complete the access to the base station [S53 to S56]. To this end, the user equipment may transmit a specific sequence as a preamble via a physical random access channel (PRACH) [S53] and may be then able to receive a response message via PDCCH and a corresponding PDSCH in response to the random access [S54]. In case of a contention based random access, it may be able to perform a contention resolution procedure such as a transmission S55 of an additional physical random access channel and a channel reception S56 of a physical downlink control channel and a corresponding physical downlink shared channel.

Having performed the above mentioned procedures, the user equipment may be able to perform a PDCCH/PDSCH reception S57 and a PUSCH/PUCCH (physical uplink shared channel/physical uplink control channel) transmission S58 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 6:
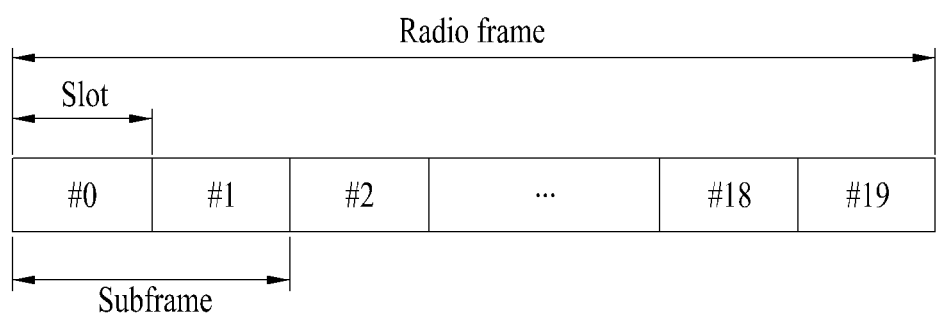
FIG. 6 shows a structure of a radio frame in 3GPP LTE.

FIG. 6 shows a structures of a radio frame in 3GPP LTE.

Referring to FIG. 6, a radio frame includes 10 subframes. Each of the subframes includes 2 slots in a time domain. And, a time taken to transmit one subframe is defined as a transmission time interval (hereinafter abbreviated TTI). For instance, one subframe can have a length of 1 ms and one slot can have a length of 0.5 ms.

One slot includes a plurality of OFDM (orthogonal frequency division multiplexing) symbols in a time domain. Since 3GPP LTE system uses OFDMA in DL, the OFDM symbol is provided to indicate one symbol period. And, one symbol may be called SC-FDMA symbol or symbol period. A resource block is a resource allocation unit and includes a plurality of contiguous subcarriers in one slot.

The structure of the radio frame shown in the drawing is just one example. Optionally, the number of subframes included in one radio frame, the number of slots included in one subframe, or the number of symbols included in one slot may be modifiable in various ways.

Figure 7:
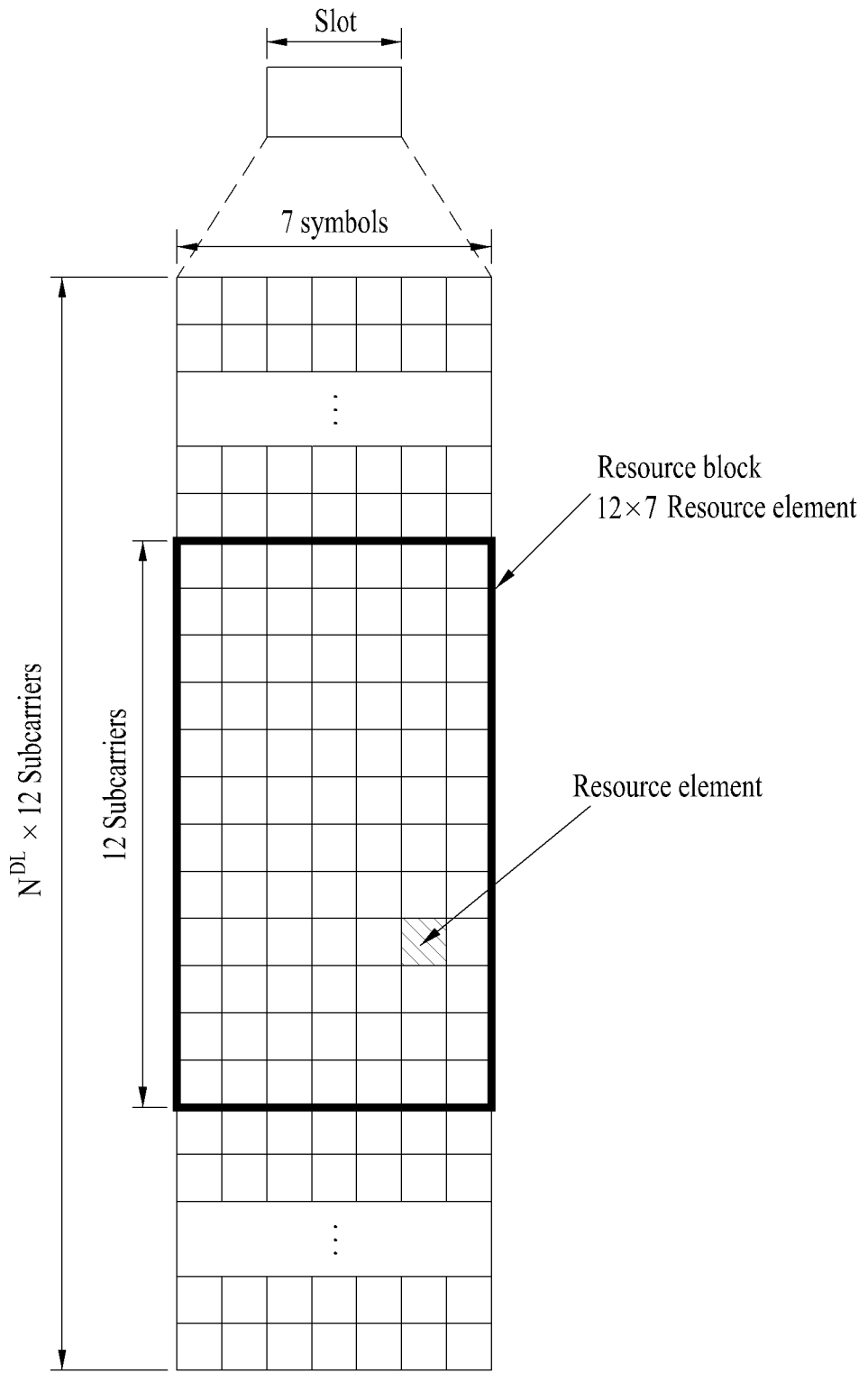
FIG. 7 is a diagram for one example of a resource grid for a single downlink slot.

FIG. 7 is a diagram for one example of a resource grid for one DL slot.

Referring to FIG. 7, one DL slot may include a plurality of OFDM symbols. In this case, for instance, one DL slot includes 7 OFDM symbols and one resource block (RB) includes 12 subcarriers in frequency domain, by which the present invention may be non-limited.

Each element on a resource grid is called a resource element. One resource block includes 12×7 resource elements. The number $N^{DL}$ of resource blocks included in a DL slot depends on a DL transmission bandwidth. A structure of a UL slot may be identical to that of the DL slot.

Figure 8:
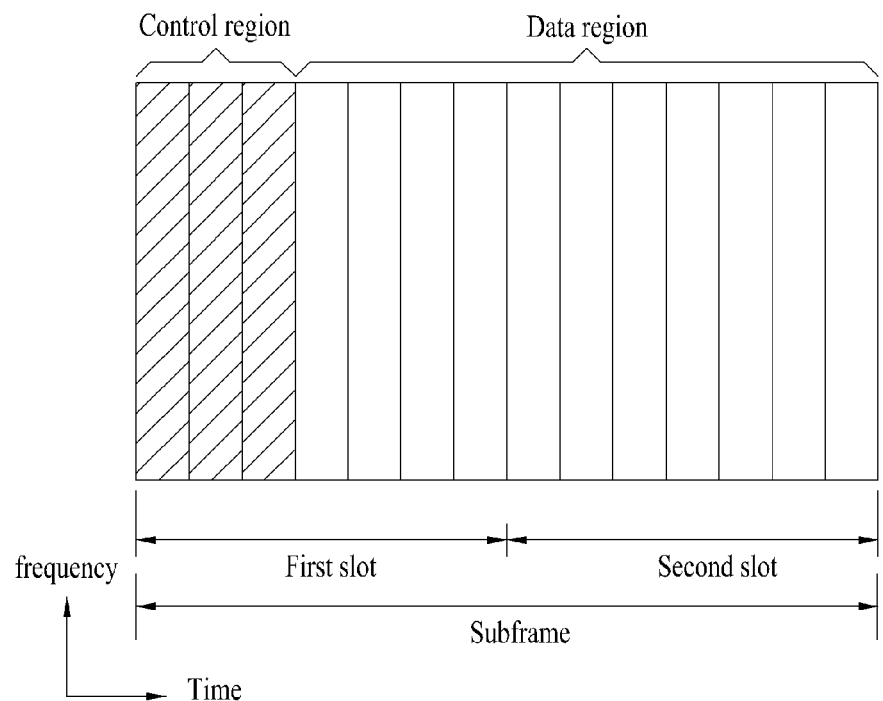
FIG. 8 shows a structure of a downlink subframe.

FIG. 8 shows a structure of a downlink (DL) subframe.

Referring to FIG. 8, maximum 3 OFDM symbols situated in a fore part of a first slot of one subframe correspond to a control region to which control channels are assigned. The rest of OFDM symbols correspond to a data region to which PDSCH (physical downlink shared channel) is assigned. Examples of a DL control channel used by 3GPP LTE may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number (i.e., a size of a control region) of OFDM symbols used for a transmission of a control channel within the subframe. The PHICH is a response channel to uplink and carries ACK/NACK (acknowledgement/non-acknowledgement) signal for HARQ (hybrid automatic repeat request). Control information carried on PDCCH is called downlink control information (DCI). The DCI may include UL resource allocation information, DL resource allocation information or a UL transmission (Tx) power control command for a random UE (user equipment) group.

The PDCCH can carry resource allocation and transmission format (called DL grant) of DL-SCH (downlink shared channel), resource allocation information (called UL grant) of UL-SCH (uplink shared channel), paging information on PCH (paging channel), system information on DL-SCH, resource allocation for such an upper layer control message as a random access response transmitted on PDSCH, a set of transmission power control commands for individual UEs within a random UE group, activation of VoIP (voice over IP) and the like. A plurality of PDCCHs can be transmitted within the control region. A user equipment can monitor a plurality of the PDCCHs. The PDCCH is configured with a set of a plurality of contiguous CCEs (control channel elements). The CCE is a logical allocation unit used to provide the PDCCH with a coding rate based on a radio channel status. The CCE corresponds to a plurality of REGs (resource element groups). A format of the PDCCH and the number of available PDCCH bits may be determined in accordance with correlation between the number of CCEs and a coding rate provided by the CCEs.

A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with a unique identifier (e.g., cell-RNTI (C-RNTI)) of the corresponding user equipment. In case that the PDCCH is provided for a paging message, the CRC may be masked with a paging indicator identifier (e.g., P-RNTI (paging-RNTI)). If the PDCCH is provided for system information (particularly, for a system information block (SIB)), the CRC may be masked with a system information identifier, a system information RNTI (SI-RNTI). In order to indicate a random access response to a transmission of a random access preamble of a user equipment, the CRC may be masked with RA-RNTI (random access-RNTI).

Figure 9:
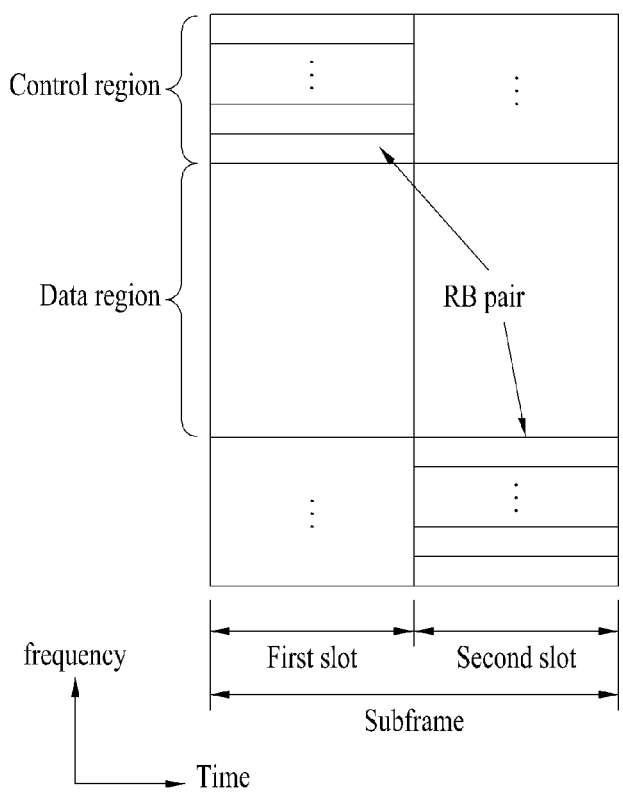
FIG. 9 shows a structure of an uplink subframe.

FIG. 9 shows an uplink (UL) subframe.

Referring to FIG. 9, a UL subframe may be divided into a control region and a data region in frequency domain. A physical UL control channel (PUCCH) for carrying UL control information is assigned to the control region. And, a physical UL shared channel (PUSCH) for carrying user data is assigned to the data region. In order to maintain single carrier property, one user equipment does not transmit PUCCH and PUSCH simultaneously. A resource block pair (RB pair) is assigned to PUCCH for one user equipment. Resource blocks (RBs) belonging to the resource block pair occupy different subcarriers in 2 slots, respectively. Such an effect can be expressed as 'a pair of resource blocks assigned to PUCCH perform frequency hopping on a slot boundary'.

2.2. MIMO (Multi-Input Multi-Output)

Breaking away from using a single transmitting antenna and a single receiving antenna in general so far, the MIMO technology uses multiple transmitting (Tx) antennas and multiple receiving (Rx) antennas. Namely, the MIMO technology includes the technology for enhancing capacity and performance by means of using multiple input/output antennas for a transmitting or receiving side of a wireless communication system. In the following description, 'MIMO' can be interchangeably named 'multi-input multi-output antenna'.

In particular, the MIMO technology does not depend on a single antenna path in order to receive one total message but completes total data by collecting a multitude of data fragments received via several antennas. Consequently, the MIMO technology can increase a data transfer rate in a specific system range and extend a system range through a specific data transfer rate.

Since the next generation mobile communication requires a data transfer rate much higher than that of an existing mobile communication, it is expected that the efficient MIMO technology will become inevitably necessary. In this situation, the MIMO communication technology is the next generation mobile communication technology widely available for a mobile communication terminal, a relay node and the like. And, the MIMO communication technology draws many attentions to the need for the technology for overcoming the mobile communication transmission traffic limit that varies depending on a critical situation due to data communication expansion and the like.

Meanwhile, the MIMO technology among various transmission efficiency enhancement technologies currently researched and developed is currently and greatly noticed as a method of remarkably enhancing communication capacity and transceiving performance without additional frequency assignment or power increase.

Figure 10:
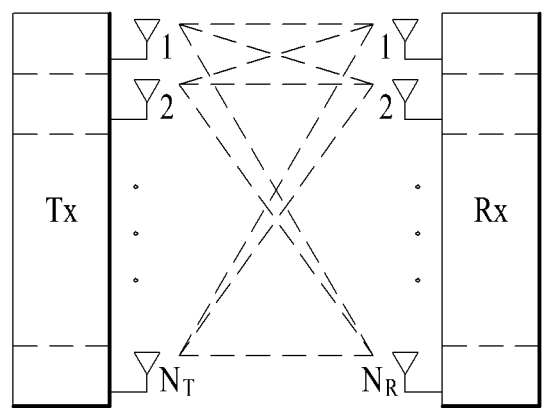
FIG. 10 is a diagram for a configuration of a general MIMO (multi-input multi-output) communication system.

FIG. 10 is a diagram for a configuration of a general multi-input multi-output antenna (MIMO) communication system.

Referring to FIG. 10, if the number of transmitting antennas is incremented into $N_T$ and the number of receiving antennas is incremented into $N_R$, simultaneously, theoretical channel transmission capacity is increased in proportion to the number of antennas unlike the case that a transmitter or receiver uses a plurality of antennas. Hence, a transfer rate can be enhanced and frequency efficiency can be remarkably raised. The transfer rate according to the increase of the channel transmission capacity may be theoretically raised by an amount resulting from multiplying a maximum transfer rate $R_0$ of the case of using a single antenna by a rate increasing rate $R_i$.

$$R_i = \min(N_T, N_R) \quad \text{[Formula 1]}$$

In particular, for instance, in an MIMO communication system using 4 transmitting antennas and 4 receiving antennas, it is able to obtain a transfer rate 4 times higher than that of a single antenna system theoretically.

The above-described MIMO technology can be categorized into a spatial diversity scheme of raising transfer reliability using symbols passing through various channel paths or a spatial multiplexing scheme of raising a transfer rate by simultaneously transmitting a multitude of data symbols using a multitude of transmitting antennas. And, many ongoing efforts are made to research and develop a scheme of obtaining advantages of the above-mentioned two schemes in a manner of appropriately combining the above-mentioned two schemes together.

The above-mentioned schemes are described in detail as follows.

First of all, in case of the spatial diversity scheme, there are a space-time block code series scheme and a space-time Trellis code series scheme using both a diversity gain and a coding gain simultaneously. The Trellis coding scheme is advantageous in the bit error improvement performance and the degree of freedom in code generation but the space-time block coding is simpler than the Trellis coding in computation complexity. The spatial diversity gain corresponds to an amount obtained from the product $(N_T \times N_R)$ of the transmitting antenna number $(N_T)$ and the receiving antenna number $(N_R)$.

Secondly, the spatial multiplexing scheme relates to a method of transmitting a different data column from each transmitting antenna. In doing so, mutual interference generated between data simultaneously transmitted from a transmitter is caused to a receiver. Hence, the receiver removes the interference using an appropriate signal processing scheme and then receives the data. In this case, the means for removing the noise may include one of an MLD (maximum likelihood detection) receiver, a ZF (zero-forcing) receiver, an MMSE (minimum mean square error) receiver, a D-BLAST (Diagonal-Bell Laboratories Layered Space-Time), a V-BLAST (Vertical-Bell Laboratories Layered Space-Time) and the like. Specifically, if a transmitting side is aware of channel information, it is able to use SVD (singular value decomposition) or the like.

Thirdly, there is the scheme of combining the spatial diversity and the spatial multiplexing. If a spatial diversity gain is obtained only, a performance improvement gain gets saturated gradually in accordance with an increment of a diversity order. If a spatial multiplexing gain is taken only, transfer reliability on a radio channel is lowered. Many efforts have been made to research and develop a method of obtaining the two types of gains by solving the above problems. And, such a method may include one of space-time block coding (Double-STTD), space-time BICM (ST-BICM) and the like.

In order to describe a communicating method in the above-mentioned MIMO system in detail, the corresponding mathematical modeling can be represented as follows.

First of all, referring to FIG. 10, assume that $N_T$ transmitting antennas and $N_R$ receiving antennas exist.

Regarding a transmission signal, if there are $N_T$ transmitting antennas, $N_T$ maximum transmittable informations exist. Hence, the transmission information may be represented as the following vector.

$$s = [s_1, s_2, \ldots, s_{N_T}]^T \quad \text{[Formula 2]}$$

Meanwhile, transmission power can be set different for each transmission information $s_1, s_2, \ldots, s_{N_T}$. If the respective transmission powers are set to $P_1, P_2, \ldots, P_{N_T}$, the transmission power adjusted transmission information may be represented as the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, $\hat{S}$ may be represented as follows using a transmission power diagonal matrix P.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

If a weight matrix W is applied to the transmission power adjusted transmission information vector $\hat{S}$, a case of configuring $N_T$ transmission signals $x_1, x_2, \ldots, x_{N_T}$ actually transmitted can be taken into consideration as follows. In this case, the weight matrix W plays a role in properly distributing each transmission information to each antenna according to a transmission channel status and the like. The $x_1, x_2, \ldots, x_{N_T}$ may be represented using a vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Formula 5]}$$

In Formula 5, $w_{ij}$ indicates a weight between an $i^{th}$ transmitting antenna and $j^{th}$ information, which is expressed as a matrix W. And, the matrix W may be called a weight matrix or a precoding matrix.

Meanwhile, the above-mentioned transmission signal x can be considered in case of using spatial diversity or spatial multiplexing as follows.

First of all, in case of using spatial multiplexing, since different signals are transmitted by being multiplexed, all elements of the information vector s have different values, respectively. On the contrary, in case of using spatial diversity, since a same signal is transmitted via several channel paths, all elements of the information vector s have the same value.

Of course, it is able to consider a method of mixing spatial multiplexing and spatial diversity with each other. In particular, for instance, a same signal is transmitted through 3 transmitting antennas by spatial diversity and the rest of the different signals can be transmitted by spatial multiplexing.

Meanwhile, when $N_R$ receiving antennas exist, reception signals $y_1, y_2, \ldots, y_{N_R}$ of the receiving antennas can be represented as a vector y in the following.

$$y = [y_1, y_2, \ldots, y_{N_R}]^T \quad \text{[Formula 6]}$$

If a channel is modeled in MIMO communication system, each channel can be identifies by an index of a transmitting/receiving antenna. And, a channel from a transmitting antenna j to a receiving antenna i may be represented as $h_{ij}$. Regarding the order of an index of the $h_{ij}$, it should be noted that a receiving antenna index is followed by a transmitting antenna index.

These channels can be represented as a vector and matrix form in a manner of tying several channels together.

Figure 11:
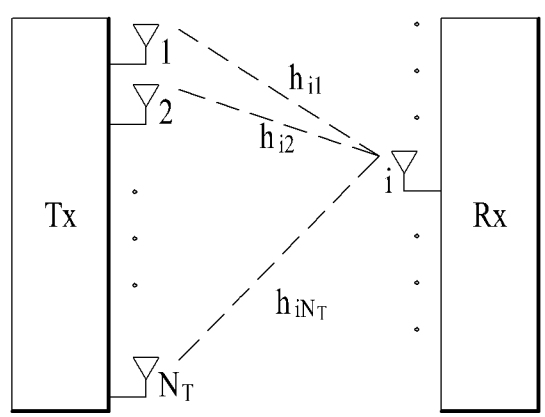
FIG. 11 is a diagram of channels from $N_T$ transmitting antennas to a receiving antenna i.

FIG. 11 is a diagram of a channel to a receiving antenna i from each of $N_T$ transmitting antennas.

Referring to FIG. 11, the channels to the receiving antenna i from total $N_T$ transmitting antennas can be represented as follows.

$$h_i^T = [h_{i1}, h_{i2}, \ldots, h_{iN_T}] \quad \text{[Formula 7]}$$

Moreover, all the channels from $N_T$ transmitting antennas through $N_R$ receiving antennas may be represented using the matrix expression of Formula 7 as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Formula 8]}$$

In an actual channel, since a transmission signal passes through a channel matrix H and then has AWGN (additive white Gaussian noise) added thereto, the white noises $n_1, n_2, \ldots, n_{N_R}$ respectively added to $N_R$ receiving antennas can be represented as a vector in the following.

$$n = [n_1, n_2, \ldots, n_{N_R}]^T \quad \text{[Formula 9]}$$

Through the modeling of the above-mentioned transmission signal, reception signal, channel and white noise, each of the above-mentioned transmission signal, reception signal, channel and white noise can be expressed through the following relationship.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Formula 10]}$$

$$Hx + n$$

Meanwhile, the number of rows/columns of a channel matrix H indicating a channel state is dependent on the number of transmitting/receiving antennas. As mentioned in the foregoing description, the number of rows in the channel matrix H is equal to the number $N_R$ of the receiving antennas. The number of columns in the channel matrix H is equal to the number $N_T$ of the transmitting antennas. In particular, the channel matrix H becomes $N_R \times N_T$ matrix.

In general, a rank of matrix is defined as a minimum one of the number of independent rows and the number of independent columns. Hence, it may be impossible for a rank of matrix to become greater than the number of rows or columns. Regarding a numerical expression, a rank (i.e., rank(H)) of a channel matrix H is restricted as follows.

$$\text{Rank}(H) \leq \min(N_T, N_R) \quad \text{[Formula 11]}$$

Moreover, when Eigen value decomposition is performed on a matrix, a rank may be defined as the number of Eigen values except 0. Similarly, for a further definition of a rank, when singular value decomposition is performed, a rank may be defined as the number of singular values except 0. Hence, the physical meaning of a rank in a channel matrix may be regarded as a maximum number for sending different information on a given channel.

In the present specification, 'rank' for MIMO transmission indicates the number of paths for independently transmitting a signal in a specific time resource on a specific frequency resource, while 'the number of layers' indicates the number of signal streams transmitted via each path. Since a transmitting side generally transmits layers of which number corresponds to the number of ranks used for a signal transmission, a rank has the same meaning of the layer number unless mentioned specially.

2.3. Reference Signal (RS)

Since data is transmitted on a radio channel in a wireless communication system, the data may be distorted on radio in the course of the transmission. In order for a receiving side to correctly receive the distorted signal, the distortion of the received signal should be corrected using channel information. In order to detect the channel information, it is able to mainly use a signal transmitting method known to both of the receiving side and the transmitting side and a method of detecting the channel information using a level of distortion in transmitting a signal on a channel. The above-mentioned signal can be called a pilot signal or a reference signal (RS).

When data is transceived using multi-input multi-output antennas, in order to correctly receive the data, it is preferable that a channel state between a transmitting antenna and a receiving antenna is detected. Hence, each transmitting antenna should have an individual reference signal.

Downlink reference signals may include a common reference signal (CRS) shared with all user equipments in a single cell and a dedicated reference signal (DRS) for a specific user equipment only. Using these reference signals, information for demodulation and channel measurement can be provided.

A receiving side (i.e., a user equipment) measures a channel state using CRS and can feed such an indicator related to a channel quality as a CQI (Channel Quality Indicator), a PMI (Precoding Matrix Index) and/or an RI (Rank Indicator) back to a transmitting side (e.g., a base station). The CRS may be called a cell-specific reference signal (RS). Yet, a reference signal related to a feedback of channel state information (CSI) can be defined as CSI-RS.

DRS can be transmitted on resource elements to user equipments if demodulation of data on PDSCH is necessary. A user equipment can receive information indicating a presence or non-presence of DRS through an upper layer. The DRS is valid only if the corresponding PDSCH is mapped. And, the DRS may be called a UE-specific reference signal (RS) or a demodulation reference signal (DMRS).

FIG. 12 is a diagram to illustrate a reference signal pattern mapped to a DL resource block (RB) pair defined in 3GPP LTE system.

Referring to FIG. 12, a DL resource block (RB) pair, which is a unit for mapping a reference signal, may be represented as '1 subframe in time domain×12 subcarriers in frequency domain'. In particular, one resource block on a time axis (x-axis) may have a length of 14 OFDM symbols in case of a normal CP (cyclic prefix) [cf. FIG. 12 (a)] or a length of 12 OFDM symbols in case of an extended CP (cyclic prefix) [cf. FIG. 12 (b)]. In a resource block grid, resource elements (REs) denoted by 0, 1, 2 and 3 in each resource block mean locations of CRSs of antenna port indexes 0, 1, 2 and 3, respectively. And, resource elements denoted by 'D' mean locations of DRS.

In the following description, CRS is explained in detail. First of all, CRS is used to estimate a channel of a physical antenna, is a reference signal receivable in common by all user equipments (UEs) in a cell, and is distributed across a whole frequency band. Moreover, the CRS may be used for channel state information (CSI) and data demodulation.

The CRS may be defined in various formats in accordance with antenna array in a transmitting side (i.e., a base station). In 3GPP LTE (e.g., Rel-8) system, various kinds of antenna arrays are supported and a DL signal transmitting side has 3 kinds of antenna arrays such a single transmitting antenna, 2 transmitting antennas and 4 transmitting antennas. In case that a base station uses a single transmitting antenna, reference signals for a single antenna port are arranged. In case that a base station uses 2 transmitting antennas, reference signals for 2 transmitting antenna ports are arranged using time division multiplexing (TDM) and/or frequency division multiplexing (FDM). In particular, in order to discriminate the reference signals for the 2 antenna ports from each other, different time resources and/or different frequency resources are allocated to the reference signals, respectively. Moreover, in case that a base station uses 4 transmitting antennas, reference signals for 4 transmitting antenna ports are arranged using TDM and/or FDM. Channel information measured by a receiving side (i.e., a user equipment) of a DL signal may be usable to demodulate data transmitted using such a transmission scheme as single transmitting antenna transmission, transmit diversity, closed-loop spatial multiplexing, open-loop spatial multiplexing and multi-user MIMO and the like.

In case that the MIMO antenna is supported, when a reference signal is transmitted from a specific antenna port, the reference signal is carried on locations of resource elements specified in accordance with a pattern of the reference signal but is not carried on locations of resource elements specified for other antenna ports. In particular, reference signals between different antennas do not overlap each other.

A rule for mapping CRS to a resource block is defined as follows.

$$k = 6m + (v + v_{shift}) \bmod 6 \quad \text{[Formula 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v_{shift} = N_{ID}^{cell} \bmod 6$$

-continued $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

In Formula 12, k indicates a subcarrier index, l indicates a symbol index, and p indicates an antenna port index. $N_{symb}^{DL}$ indicates the number of OFDM symbols in one downlink slot, $N_{RB}^{DL}$ indicates the number of radio resources allocated to downlink, $n_s$ indicates a slot index, and $N_{ID}^{cell}$ indicates a cell ID. Moreover, 'mod' means a modulo operation. A location of a reference signal may vary in frequency domain depending on a value of $V_{shift}$. Since the $V_{shift}$ value depends on a cell ID, a location of a reference signal can have a different frequency shift value for each cell.

In particular, a location of CRS can be shifted in frequency domain in order to raise channel estimation performance through the CRS. For instance, if a reference signal is located at every 3 subcarriers, reference signals in one cell are assigned to $3k^{th}$ subcarrier, while a reference signal in another cell is assigned to $(3k+1)^{th}$ subcarrier. In viewpoint of one antenna port, reference signals are arranged by 6-RE intervals in frequency domain and are preferably spaced apart from a reference signal assigned to another antenna port by 3-RE interval.

Reference signals are arranged by constant intervals by starting from a symbol index 0 of each slot in time domain. A time interval is defined different in accordance with a cyclic prefix (CP) length. In case of a normal cyclic prefix, a reference signal is located at symbol indexes 0 and 4 of a slot. In case of an extended cyclic prefix, a reference signal is located at symbol indexes 0 and 3 of the slot. A reference signal for an antenna port having a maximum value in two antenna ports is defined within one OFDM symbol. Hence, in case of 4-transmitting antenna transmission, reference signals for antenna ports 0 and 1 are located at symbol indexes 0 and 4 (or symbol indexes 0 and 3 in case of an extended CP) of each slot. And, reference signals for antenna ports 2 and 3 are located at symbol index 1 of the slot. Yet, locations of the reference signals for the antenna ports 2 and 3 in frequency domain may be switched to each other in a $2^{nd}$ slot.

In the following description, DRS is explained in detail. First of all, in LTE system, DRS is used to demodulate data. In MIMO antenna transmission, when a user equipment receives a reference signal, a precoding weight used for a specific user equipment is combined with a transport channel transmitted from each transmitting antenna and is then used to estimate a corresponding channel without change.

The 3GPP LTE system (e.g., Release-8) supports maximum 4 transmitting antennas and defines DRS for rank 1 beamforming. The DRS for the rank 1 beamforming indicates a reference signal for antenna port index 5 as well.

A rule for mapping DRS to a resource block is defined as follows. Formula 13 shows a case of a normal cyclic prefix (CP), while Formula 14 shows a case of an extended cyclic prefix (CP).

$$k = (k') \bmod N_{sc}^{RB} + N_{sc}^{RB} \cdot n_{PRB} \quad \text{[Formula 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Formula 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Formulas 12 to 14, the k indicates a subcarrier index and the p indicates an antenna port. The $N_{RB}^{DL}$, ns and $N_{cell}^{ID}$ indicate the number of RBs assigned to each DL, the number of slot indexes and the number of cell IDs, respectively. And, a location of a reference signal varies in viewpoint of a frequency domain depending on a value of the $V_{shift}$.

In Formula 13 and Formula 14, the k indicates a subcarrier index, the l indicates a symbol index, and the p indicates an antenna port. The $N_{SC}^{RB}$ indicates a resource block size in frequency domain and may be represented as the number of subcarriers. The $n_{PRB}$ indicates a physical resource block number. And, the $N_{RB}^{PDSCH}$ indicates a bandwidth of a resource block of a corresponding PDSCH transmission. The $n_s$ indicates a slot index and $N_{ID}^{cell}$ indicates a cell ID. Moreover, the 'mod' means a modulo operation. A location of a reference signal in frequency domain varies depending on a value of the $V_{shift}$. Since the $V_{shift}$ value depends on a cell ID, the position of the reference signal has one of various frequency shift values in accordance with a cell.

2.4. CoMP (Coordinated Multi-Point Transmission and Reception)

For the purpose of performance enhancement of a system, in order to meet the LTE-A requirements, CoMP transmission has been proposed. In this case, the CoMP may be called one of co-MIMO, collaborative MIMO, network MIMO and the like. The CoMP is expected to enhance performance of a user equipment on a cell boundary and throughput of an average cell (or sector).

Generally, in a multi-cell environment having a frequency reuse factor set to 1, the performance and average cell (sector) efficiency of the user equipment located on the cell boundary may be lowered due to inter-cell interference (ICI). In order to reduce the inter-cell interference (ICI) and provide reasonable processing performance to the user equipment located on the cell boundary in an interference-limited environment, such a simple manual method as a fractional frequency reuse (FFR) is applied to LTE-A system. Yet, a method of reducing inter-cell interference or reusing the inter-cell interference as a desired signal is more advantageous than a method of reducing a use of a frequency resource per cell. In order to achieve the above-mentioned object, the CoMP transmission scheme is applicable.

The CoMP schemes applicable to DL can be classified into joint processing (JP) scheme and coordinated scheduling/coordinated beamforming (CS/CB) scheme. In case of the JP scheme, data can be used for each point (base station) of CoMP unit. In this case, the CoMP unit means a set of base stations used by the CoMP scheme. The JP scheme may be subdivided into a joint transmission scheme and a dynamic cell selection scheme.

The joint transmission scheme means a scheme of simultaneously transmitting signals on PDSCH from a plurality of points (e.g., a portion of the CoMP unit or the whole CoMP unit). In particular, data can be simultaneously transmitted to a single user equipment from a plurality of transmission points. The joint transmission scheme enhances a quality of a signal transmitted to a user equipment irrespective of 'coherently' or 'non-coherently' and/or removes interference with other user equipments actively.

The dynamic cell selection means a scheme of transmitting a signal on PDSCH from a single point in CoMP unit. In particular, data transmitted to a single user equipment at a specific time is transmitted from a single point but data is not transmitted to the user equipment from other points in the CoMP unit. And, the point for transmitting data to a user equipment can be selected dynamically.

According to the CS/CB scheme, the CoMP unit collaboratively performs beamforming for the data transmission to a single user equipment. In particular, although data is transmittable to a user equipment in a serving cell only, user scheduling/beamforming can be determined by collaboration among a plurality of cells in the CoMP unit.

In case of UL, the CoMP reception means a reception of signals transmitted by collaboration with a plurality of points geographically separated from each other. The CoMP scheme applicable to the UL can be categorized into a joint reception (JR) scheme or a CS/RS (coordinated scheduling/beamforming) scheme.

The JR scheme means a scheme that a plurality of points corresponding to all or a portion in the CoMP unit receive a signal transmitted on PDSCH. According to the CS/CB scheme, a single point receives a signal transmitted on PDSCH only. Yet, the user scheduling/beamforming can be determined by collaboration with a plurality of cells in the CoMP unit.

2.5. Sounding Reference Signal (SRS)

Sounding reference signal (SRS) is mainly used for channel quality measurement to perform a frequency-selective scheduling and is not associated with UL data and/or control information transmission, by which the sounding reference signal is non-limited. For instance, the SRS may be usable for other purposes such as a purpose of an improved power control, a purpose of supporting various start-up functions of recently unscheduled user equipments. For example, the start-up functions of the user equipments may include an initial modulation and coding scheme (MCS), an initial power control for data transmission, a timing advance and a frequency semi-selective scheduling. In this case, the frequency semi-selective scheduling means the scheduling performed in a manner of selectively assigning a frequency resource in a $1^{st}$ slot of a subframe and assigning a frequency in a $2^{nd}$ slot in a manner of pseudo-randomly hopping into another frequency.

Moreover, the SRS may be usable to measure a DL channel quality on the assumption that a radio channel is reciprocal between UL and DL. This assumption is particularly effective to a TDD (time division duplex) system in which a UL and a DL share the same frequency spectrum with each other by being separated from each other in time domain.

Subframes of SRS transmitted by a prescribed user equipment within a cell can be indicated by a cell-specific broadcast signal. A 4-bit cell-specific parameter 'srsSubframeConfiguration' indicates 15 kinds of available configurations of a subframe transmittable in each radio frame. Using these SRS configurations, SRS overhead can be flexibly adjusted in accordance with a deployment scenario. A $16^{th}$ configuration of SRS is to completely turns of a witch of an SRS within a cell, which is suitable for a serving cell that mainly serves fast user equipments.

Figure 13:
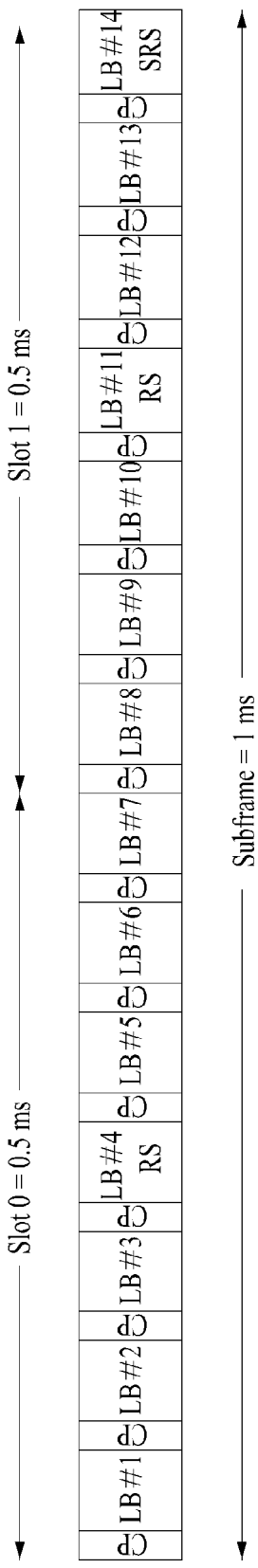
FIG. 13 shows an uplink subframe including SRS symbol.

FIG. 13 shows an uplink (UL) subframe including SRS symbols usable.

Referring to FIG. 13, SRS is always transmitted on a last SC-FDMA symbol of a configured subframe. Hence, SRS and DMRS (demodulation reference signal) are located at different SC-FDMA symbols, respectively. PUSCH data transmission is not allowed to be performed on SC-FDMA symbol designated to SRS transmission. Hence, if a sounding overhead is highest (i.e., a case that an SRS transmission symbol is included in every subframe), it does not exceed about 7%.

Each SRS symbol is generated for a given time unit and frequency band by a basic sequence (e.g., a random sequence, a set of ZC-based (Zadoff Chu-based) sequences) and every user equipment within a cell uses the same basic sequence. In doing so, SRS transmissions from a plurality of user equipments within a cell on the same frequency band can be identified from each other by becoming orthogonal to each other by different cyclic shifts of the basic sequence, respectively. Since a different basic sequence is assigned to each cell, an SRS sequence from a different cell may be identifiable. Yet, orthogonality between the different basic sequences are not guaranteed for SRS symbol.

2.6. Relay Node

A relay node forwards data transceived between a base station and a user equipment via two kinds of links (i.e., a backhaul link and an access link) differing from each other. The base station may include a donor cell. And, the relay node is connected by wireless to a wireless access network via the donor cell.

Meanwhile, regarding a use of a band (or spectrum) of a relay node, one case in which a backhaul link operates on the same frequency band of an access link may be referred to as 'in-band', and the other case in which a backhaul link operates on a frequency band different from that of an access link is referred to as 'out-band'. In both of the above-mentioned two cases of the in-band and the out-band, it is necessary for a user equipment (hereinafter named a legacy user equipment) operating in a legacy LTE system (e.g., Release-8) to access a donor cell.

Relay nodes may be classified into a transparent relay node and a non-transparent relay node depending on whether a user equipment recognizes the relay node. In particular, the 'transparent' may mean a case that a user equipment is unable to recognize whether the user equipment is communicating with a network through a relay node. And, the 'non-transparent' may mean a case that a user equipment is able to recognize whether the user equipment is communicating with a network through a relay node.

Regarding controls of a relay node, relay nodes can be classified into one relay node configured as a part of a donor cell and another relay node capable of controlling a cell by itself.

Although the relay node configured as a part of the donor cell may have a relay node identifier (relay ID), the corresponding relay node does not have a cell identity of its own. If at least one portion of RPM (Radio Resource Management) is controlled by a base station having the donor cell belong thereto, the relay node may mean a relay node (RN) configured as a part of the donor cell despite that the rest of the RPM is located at the relay node. Preferably, this relay node can support a legacy user equipment. For example, smart repeaters, decode-and-forward relays, L2 ($2^{nd}$ layer) relay nodes of various types, and a type-2 relay node may belong to the category of the above-mentioned relay node.

In case of the relay node configured to self-control a cell, the corresponding relay node controls one or more cells and a unique physical layer cell identity is provided to each cell controlled by the relay node. And, each of the cells controlled by the relay node can use the same RPM mechanism. In aspect of a user equipment, there is no difference between accessing a cell controlled by the relay node and accessing a cell controlled by a general base station. The cell controlled by the relay node can support a legacy user equipment. For example, a self-backhauling relay node, an L3 ($3^{rd}$ layer) relay node, a type-1 relay node, and a type-1a relay node may belong to the category of the above-mentioned relay node.

The type-1 relay node plays a role as an in-band relay node in controlling a plurality of cells, and each of a plurality of the cells can be identified as a separate cell from a donor cell in aspect of a user equipment. Moreover, each of a plurality of the cells has a physical cell ID (defined in LTE Release-8) of its own and the type-1 relay node can transmit a synchronization channel of its own, a reference signal and the like. In case of a single-cell operation, a user equipment may directly receive scheduling information and HARQ feedback from a type-1 relay node and can transmit its control channel (e.g., scheduling request (SR), CQI, ACK/NACK, etc.) to the type-1 relay node. Moreover, legacy user equipments (e.g., user equipments operating in LTE Release-8 system) may consider the type-1 relay node as a legacy base station (e.g., a base station operating in the LTE Release-8 system). In particular, the type-1 relay node has backward compatibility. Meanwhile, in aspect of user equipments operating in LTE-A system, the type-1 relay node is considered as a base station different from a legacy base station, whereby performance enhancement can be provided.

The type-1a relay node operates in the out-band, and has the same features of the type-1 relay node mentioned in the foregoing description. Operation of the type-1a relay node can be configured to minimize or eliminate the influence on L1 ($1^{st}$ layer) operation.

The type-2 relay node corresponds to an in-band relay node but has no separate physical cell ID not to form a new cell. The type-2 relay node is transparent to a legacy user equipment, and the legacy user equipment is unable to recognize a presence of the type-2 relay node. Although the type-2 relay node is able to transmit PDSCH, it does not transmit CRS and PDCCH at least.

Meanwhile, in order for a relay node to operate as in-band, prescribed resources in time-frequency space must be reserved for a backhaul link and these resources may be configured not be used for an access link. This configuration is called 'resource partitioning'.

The general principles of the resource partitioning in a relay node may be described as follows. First of all, a backhaul downlink and an access downlink may be multiplexed together on a single carrier frequency by Time Division Multiplexing (TDM) [i.e., either the backhaul downlink or the access downlink is activated in specific time.). Similarly, a backhaul uplink and an access uplink may be multiplexed together on a single carrier frequency by TDM [i.e., either the backhaul uplink or the access uplink can be activated in specific time).

Regarding the backhaul link multiplexing by FDD, a backhaul downlink transmission may be performed on a downlink frequency band, and a backhaul uplink transmission may be performed on an uplink frequency band. Regarding the backhaul link multiplexing by TDD, a backhaul downlink transmission may be performed in a downlink subframe of a base station and a relay node, and a backhaul uplink transmission may be performed in an uplink subframe of the base station and the relay node.

In case of an in-band relay node, provided that both a backhaul downlink reception from a base station and an access downlink transmission to a user equipment are simultaneously performed on the same frequency band, a signal transmitted from a transmitting side of a relay node may cause signal interference to a receiving side of the relay node. In particular, signal interference or RF jamming may occur at an RF front-end of the relay node. Similarly, if both an access uplink reception from a user equipment and a backhaul uplink transmission to a base station are simultaneously performed on the same frequency band, signal interference may occur.

Therefore, it may be difficult for a relay node to implement the simultaneous transmission and reception on the same frequency band unless a sufficient separation between a received signal and a transmitted signal is provided [e.g., a transmitting antenna and a receiving antenna are installed in a manner of being sufficiently spaced apart from each other (e.g., installed on/under the ground)].

As a solution for the above signal interference problem, a relay node is enabled not to transmit a signal to a user equipment while receiving a signal from a donor cell. In particular, a gap is generated in a transmission from the relay node to the user equipment, and the user equipment (e.g., a legacy user equipment, etc.) may be configured not to expect any transmission from the relay node during this gap. This gap can be generated by configuring MBSFN (multicast broadcast single frequency network) subframe.

Figure 14:
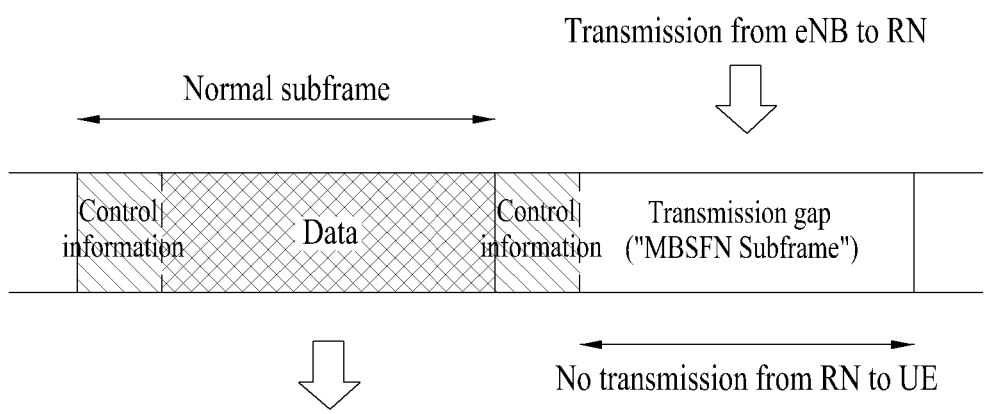
FIG. 14 is a diagram for one example of relay node resource partitioning.

FIG. 14 is a diagram for one example of a relay node resource partitioning.

Referring to FIG. 14, in a first subframe that is a normal subframe, a downlink (i.e., an access downlink) control signal and data are transmitted from a relay node to a user equipment. In a second subframe that is an MBSFN subframe, while a control signal is transmitted from the relay node to the user equipment on a control region of a downlink subframe but any transmission from the relay node to the user equipment is not performed in the rest of regions of the downlink subframe. In doing so, since a legacy user equipment expects a transmission of physical downlink control channel (PDCCH) in all downlink subframes (i.e., the relay node needs to support legacy user equipments within a coverage of the relay node to perform a measurement function thereof by receiving PDCCH in each subframe), it is necessary for the PDCCH to be transmitted in all the downlink subframes in order for each legacy user equipment to operate correctly. Therefore, in a subframe (i.e., the $2^{nd}$ subframe) configured for a downlink (i.e., backhaul downlink) transmission from a base station to a relay node, the relay node needs to perform an access downlink transmission in first N OFDM symbols (N=1, 2 or 3) rather than to receive a backhaul downlink. For this, since PDCCH signal is transmitted from the relay node to the user equipment in a control region of the second subframe, it is able to provide backward compatibility with a legacy user equipment served by the relay node. While no transmission to the user equipment from the relay node is performed in the rest of the region of the $2^{nd}$ subframe, the relay node can receive a transmission from the base station. Therefore, the above-mentioned resource partitioning scheme can prevent the access downlink transmission and the backhaul downlink reception from being simultaneously performed by the in-band relay node.

The $2^{nd}$ subframe, which uses the MBSFN subframe, shall be described in detail as follows. First of all, a control region of the $2^{nd}$ subframe may be referred to as a relay node non-hearing interval. In particular, the relay node non-hearing interval may mean the interval in which a relay node transmits an access downlink signal instead of receiving a backhaul downlink signal. As mentioned in the foregoing description, this interval may be configured to have 1-, 2- or 3-OFDM length. In the relay node non-hearing interval, a relay node performs an access downlink transmission to a user equipment and may receive a backhaul downlink from a base station in the rest of the region. In doing so, since the relay node is unable to perform both transmission and reception on the same frequency band, it may take a time for the relay node to switch from a transmitting mode to a receiving mode. Hence, it may be necessary to configure a guard time (GT) to enable the relay node to perform a transmitting/receiving mode switching in first partial interval of a backhaul downlink receiving region. Similarly, even if the relay node operates in a manner of receiving a backhaul downlink from the base station and transmitting and access downlink to the user equipment, it may be able to configure a guard time (GT) for the transmitting/receiving mode switching of the relay node. The length of the guard time may be defined as a value in time domain. For example, the length of the GT may be defined as k time samples (Ts) (where, k≥1) or may be set to the length of at least one or more OFDM symbols. Alternatively, in case that relay node backhaul downlink subframes are contiguously configured or in accordance with a prescribed subframe timing alignment relation, the guard time of a last part of a subframe may be defined or may not be configured. In order to maintain backward compatibility, this guard time may be defined only in a frequency region configured for a backhaul downlink subframe transmission This is because a legacy user equipment is not supportable if a guard time is configured in an access downlink interval. In the backhaul downlink receiving interval except the guard time, the relay node can receive a PDCCH signal and a PDSCH signal from the base station. In the meaning of a relay node dedicated physical channel, they may be represented as R-PDCCH (Relay-PDCCH) and R-PDSCH (Relay-PDSCH), respectively.

2.7. Carrier Aggregation Environment 2.7.1. The General of Carrier Aggregation

Communication environments taken into consideration by embodiments of the present invention include a multicarrier supportive environment. In particular, a multicarrier or CA (carrier aggregation) system used by the present invention means a system that uses at least one component carrier (CC) having a bandwidth smaller than a target band by aggregation in configuring a target broadband to support a broadband.

According to the present invention, multicarrier means aggregation of carriers (or carrier aggregation). In this case, the carrier aggregation means aggregation of non-contiguous carriers as well as aggregation of contiguous carriers. Moreover, the number of component carriers aggregated in DL may be set to different from that of component carriers aggregated in UL. If the downlink component carrier (hereinafter abbreviated DL CC) number and the uplink component carrier (hereinafter abbreviated UL CC) number are equal to each other, it is called a symmetric aggregation. Otherwise, it is called an asymmetric aggregation. The above-mentioned carrier aggregation may be interchangeably substituted with such a terminology as a bandwidth aggregation, a spectrum aggregation and the like.

In the carrier aggregation configured in a manner of combining at least two or more component carriers together, the goal of the LTE-A system is to support bandwidths up to 100 MHz. When at least one carrier having a bandwidth smaller than a target band is combined or aggregated, the bandwidth of the aggregated carrier may be limited to a bandwidth used by a legacy IMT system to secure backward compatibility with the legacy system. For instance, a legacy 3GPP LTE system supports bandwidths of {1.4, 3, 5, 10, 15, 20} MHz and a 3GPP LTE-advanced (LTE-A) system may be configured to support a bandwidth greater than 20 MHz for compatibility with the legacy system using the above bandwidths only. Moreover, a carrier aggregation system of the present invention may be configured to support carrier aggregation by defining a new bandwidth irrespective of bandwidths used by a legacy system.

LTE-A system uses the concept of a cell to manage radio resources. The above-mentioned carrier aggregation environment may be called a multi-cell environment (environment of multiple cells). A cell is defined as a combination of a pair of a DL resource (DL CC) and a UL resource (UL CC). Yet, the UL resource is not a necessary element. Hence, the cell may be configured with a DL resource only or both a DL resource and a UL resource. In case that a specific user equipment has one configured serving cell only, it may have one DL CC and one UL CC. Yet, in case that a specific user equipment has at least two configured serving cells, the number of DL CCs is equal to the number of the cells but the number of UL CCs may be equal to or smaller than the number of the cells. Alternatively, DL CCs and UL CCs may be configured to the contrary. In particular, in case that a specific user equipment has a plurality of configured serving cells, it may be able to support a carrier aggregation environment in which the number of UL CCs is greater than that of DL CCs. In more particular, carrier aggregation may be understood as aggregation of at least two cells differing from each other in carrier frequency (e.g., center frequency of cell). In this case, the above-mentioned 'cell' should be discriminated from a generally used cell that is an area covered by a base station.

Cells used by LTE-A system may include a primary cell (PCell) and a secondary cell (SCell). PCell and SCell may be used as a serving cell. The PCell means the cell operating on a primary frequency (or, a primary CC). The PCell is usable for a user equipment to perform an initial connection establishment process or a connection reconfiguration process. The PCell may include a cell indicated in a handover procedure. And, the PCell may mean the cell becomes a center of a control related communication in the serving cell configured in a carrier aggregation environment. The SCell may mean the cell operating on a secondary frequency (or, a secondary CC). One PCell is assigned to a specific user equipment, while at least one SCell may be assigned to the specific user equipment. The SCell is configurable only after an RRC connection has been established. And, the SCell may be usable to provide an addition radio resource. PUCCH does not exist in the rest of cells (i.e., SCell) except PCell in the serving cell configured in the carrier aggregation environment.

In the following description of embodiments, a primary component carrier (PCC) may be usable as having the same meaning of PCell and a secondary component carrier (SCC) may be usable as having the same meaning of SCell.

Figure 15:
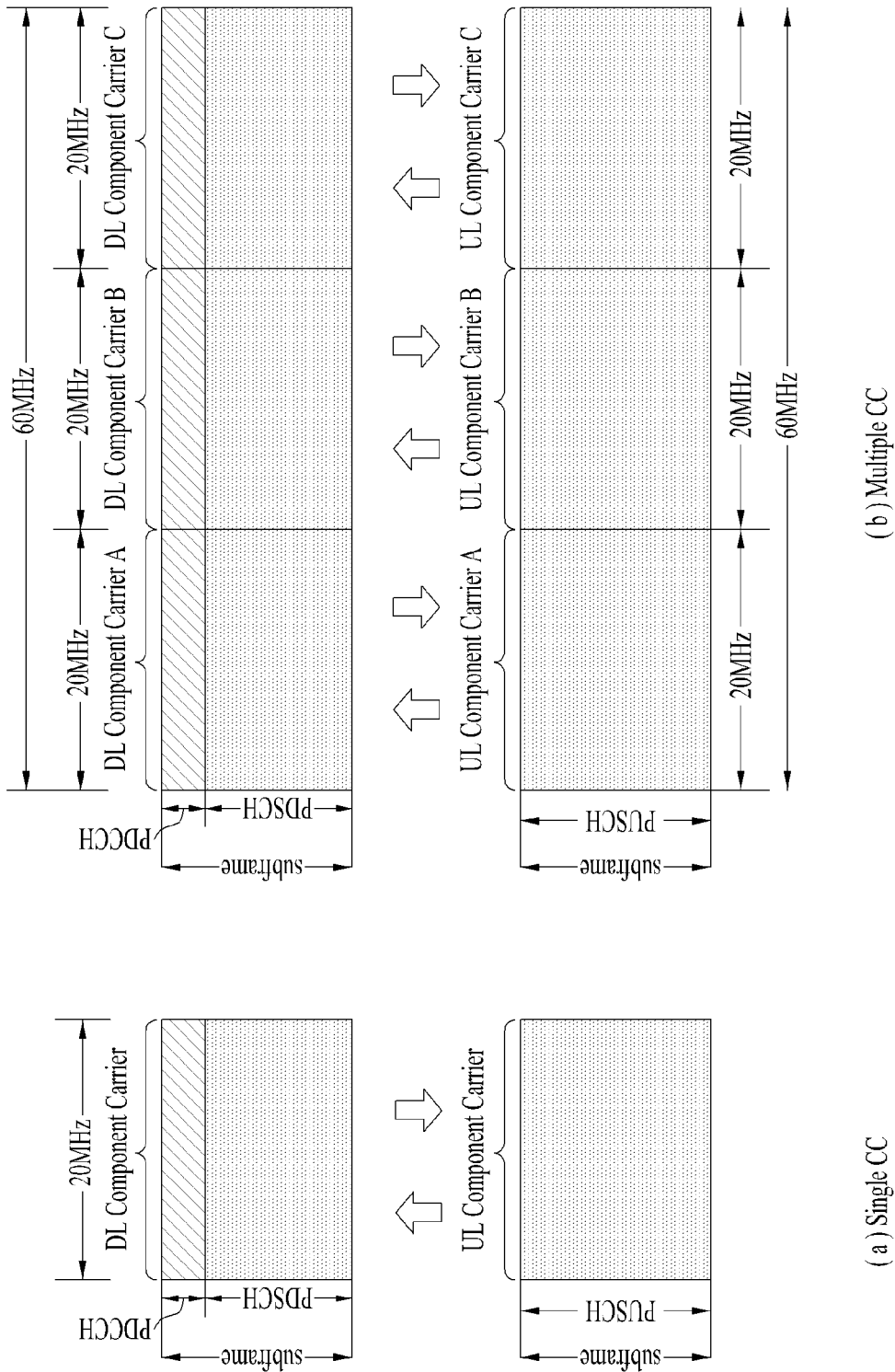
FIG. 15 is a diagram for one example of a component carrier (CC) of LTE system and carrier aggregation used in LTE-A system.

FIG. 15 is a diagram for one example of component carriers of LTE system and carrier aggregation used by LTE-A system.

FIG. 15 (a) shows a single carrier structure used by LTE system. Component carriers include DL CC and UL CC. One component carrier may have a frequency range of 20 MHz.

FIG. 15 (b) shows a carrier aggregation structure used by LTE-A system. Referring to FIG. 15 (b), 3 components carriers, each of which has a frequency size of 20 MHz, are aggregated together. 3 DL CCs and 3 UL CCs are present, by which the number of DL CCs or the number of UL CCs may be non-limited. In case of carrier aggregation, a user equipment may be able to monitor 3 CCs at the same time, receive DL signal/data, and transmit UL signal/data.

In case that N DL CCs are managed in a specific cell, a network may be able to assign M DL CCs (where, $L \leq M \leq N$) to a user equipment. In doing so, the user equipment may be able to monitor the limited M DL CCs only and receive DL signals. Moreover, a network may be able to assign primary DL CC to the user equipment in a manner of prioritizing L DL CCs (where, $L \leq M \leq N$). In doing so, the user equipment should monitor the L DL CCs. This mechanism may be exactly applicable to a UL transmission.

A linkage between a carrier frequency (or DL CC) of a DL resource and a carrier frequency (or UL CC) of a UL resource may be indicated by such an upper layer message as an RRC message or system information. For instance, by a linkage defined by SIB2 (system information block type 2), a combination of DL and UL resources may be configured. In particular, a linkage may mean a mapping relation between a DL CC for transmitting PDCCH carrying a UL grant and a UL CC using the UL grant or a mapping relation between a DL/UL CC for carrying HARQ data and a UL/DL CC for carrying HARQ ACK/NACK signal.

2.7.2. Cross Carrier Scheduling

In a carrier aggregation system, a self-scheduling method and a cross carrier scheduling method exist in aspect of carrier or serving cell scheduling. In particular, a cross carrier scheduling may be named a cross component carrier scheduling or a cross cell scheduling.

A self-scheduling means that PDCCH (DL grant) and PDSCH are carried on the same DL CC or that PUSCH transmitted in accordance with PDCCH (UL grant) carried on DL CC is transmitted on UL CC linked with the DL CC having carried the UL grant.

A cross carrier scheduling means that PDCCH (DL grant) and PDSCH are transmitted on different DL CCs, respectively or that PUSCH transmitted in accordance with PDCCH (UL grant) carried on DL CC is transmitted on a different UL CC that is not the UL CC linked with the DL CC having carried the UL grant.

Whether to perform a cross carrier scheduling may be UE-specifically activated or deactivated and may be notified to each user equipment semi-statically via an upper layer signaling (e.g., RRC signaling).

In case that the cross carrier scheduling is activated, PDCCH needs a carrier field indicator (CIF) that indicates that PDSCH/PUSCH indicated by the corresponding PDCCH is carried on which DL/UL CC. For instance, PDCCH is able to assign a PDSCH or PUSCH resource to one of a plurality of component carriers using the CIF. In particular, if PDCCH on DL CC assigns a PDSCH or PUSCH resource to one of multiply aggregated DL/UL CCs, CIF is configured. In this case, DCI format of LTE-A Release-8 may be extended in accordance with CIF. In doing so, the configured CIF is fixed to a 3-bit field or a position of the configured CIF may be stationary irrespective of a DCI format size. Moreover, it may be able to reuse a PDCCH structure of LTE-A Release-8 (e.g., a resource mapping on the basis of the same coding and CCE).

On the other hand, in case that PDCCH on DL CC assigns a PDSCH resource on the same DL CC or a PUSCH resource on a singly linked UL CC, CIF is not configured. In this case, it may be able to use the same PDCCH structure and DCI format of LTE-A Release-8 (e.g., a resource mapping on the basis of the same coding and CCE).

When a cross carrier scheduling is possible, a user equipment needs to monitor PDCCH for a plurality of DCIs in a control region of monitoring CC in accordance with a per-CC transmission mode and/or bandwidth. To support this, a search space configuration and PDCCH monitoring may be required.

In a carrier aggregation system, a UE DL CC set indicates a set of DL CCs scheduled to enable a user equipment to receive PDSCH and a UE UL CC set indicates a set of UL CCs scheduled to enable a user equipment to transmit PUSCH. And, a PDCCH monitoring set indicates a set of at least one DL CC for performing a PDCCH monitoring. The PDCCH monitoring set may be equal to the UE DL CC set or may be a subset of the UE DL CC set. The PDCCH monitoring set may include at least one of DL CCs belonging to the UE DL CC set. Alternatively, the PDCCH monitoring set may be separately defined irrespective of the UE DL CC set. The DL CC included in the PDCCH monitoring set may be configured to always enable a self-scheduling of a linked UL CC. Thus, the UE DL C set, the UE UL CC set and the PDCCH monitoring set may be configured UE-specifically, UE group-specifically or cell-specifically.

In case that the cross carrier scheduling is inactive, it means that a PDCCH monitoring set is always equal to a UE DL CC set. In this case, such an indication as a separate signaling for the PDCCH monitoring set is not necessary. Yet, in case that a cross carrier scheduling is active, it is preferable that a PDCCH monitoring set is defined within a UE DL CC set. In particular, in order to schedule a PDSCH or PUSCH for a user equipment, a base station transmits PDCCH on a PDCCH monitoring set only.

Figure 16:
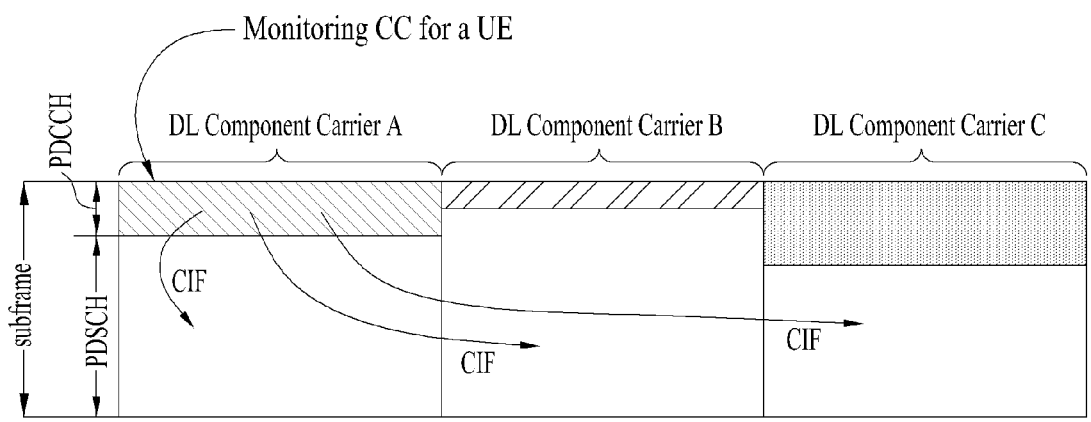
FIG. 16 shows a subframe structure of LTE-A system by cross carrier scheduling.

FIG. 16 is a diagram for a subframe structure of LTE-A system in accordance with cross carrier scheduling.

Referring to FIG. 16, a DL subframe for an LTE-A user equipment represents a case that 3 DL CCs are combined and that DL CC 'A' is set as a PDCCH monitoring DL CC. If CIF is not used, each DL CC may be able to transmit a PDCCH for scheduling its PDSCH without the CIF. On the other hand, if a CIF is used via an upper layer signaling, the only DL CC 'A' is able to transmit its PDSCH or a PDCCH for scheduling a PDSCH of another CC using the CIF. In doing so, DL CC 'B' or DL CC 'C', which is not set as the PDCCH monitoring DL CC, does not transmit PDCCH.

3. Transmission Power Controlling Method of User Equipment

When a wireless LAN (WLAN) or KTE/LTE-A user equipment is operating in transmission mode on such an unlicensed band as a white space (WS) band, the present invention is provided to control adjacent channel interference caused by out-of-band-emission power of a transmitting side in order to minimize performance degradation due to interference that can be caused to a DTV receiver, a WLAN or LTE/LTE-A receiver. In particular, while a primary user (or a licensed device) is receiving a channel on an unlicensed band, if a secondary user (or an unlicensed device) performs a transmission in uplink, the secondary user obtains information indicating a presence or non-presence of a neighbor channel and then puts restriction on a maximum transmission power value on a transmitting band channel based on the obtained information to reduce adjacent band leakage interference caused by the out-of-band-emission power. Therefore, the present invention minimizes the influence caused to an adjacent receiving band by the transmission of the wireless LAN or LTE/LTE-A user equipment on an unlicensed band, thereby enabling the primary user and the secondary user to coexist.

For clarity of the following description, a TV white space (TV WS) is taken as an example, by which the present invention is non-limited. And, it is a matter of course that the present invention is applicable to an unlicensed band that is not allowed to be exclusively used by a specific system or device.

Currently, in case that a wireless LAN (WLAN) service or a cellular service (e.g., an LTE/LTE-A service) is provided on a TV WS band, a reception performance of a wireless LAN, an LTE/LTE-A receiver or a DTV receiver, which is adjacent to a servicing user equipment, may be affected by an unnecessary out-of-band-emission power emitted by the serving user equipment.

Particularly, in case that a WLAN or LTE/LTE-A user equipment performs transmission and reception on TV WS by a database or carrier sensing scheme, a transceiving channel band is performed on a partially vacant unit channel (e.g., 6 MHz) in UHF receiving band (e.g., 470~698 MHz) of DTV. And, it is highly probable that a user equipment performing transmission and reception on such a band is unable to adopt such an RF front-end filter as a duplex filter and the like. Hence, it should be handled separately from the output-of-band emission property by the RF filter. In particular, if there is such a front-end filter for managing the whole transmission and receiving band as a duplex filter, the out-of-band emission entering a receiving antenna port from a transmitting antenna port is generally attenuated by about 45~50 dB smaller than that of a transmitting band. Thus, it is highly probable that user equipments operating on the TV WS band may not enjoy the benefit of the receiving band protection attributed to the power attenuation.

Figure 17:
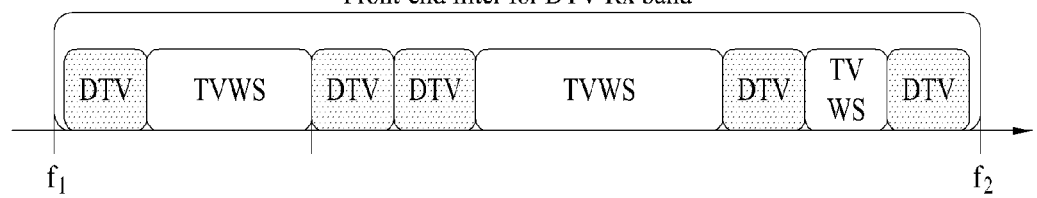
FIG. 17 shows one example of coexistence with a different service such as DTV through an available channel on DTV receiving band.

FIG. 17 shows one example of coexistence with a different service such as DTV through an available channel on a DTV receiving band.

Referring to FIG. 17, a plurality of available channels (e.g., a band denoted as TV WS) unused by a DTV can exist on a receiving band of the DTV. And, a WLAN or LTE/LTE-A user equipment can use a band assigned to itself among the available channels. In this case, the WLAN or LTE/LTE-A user equipment preferentially performs a front-end filtering for managing the whole TV WS band and then receives data on a usable available channel from a base station, thereby coexisting with the DTV or other WLAN devices without the help of RF filtering.

Figure 18:
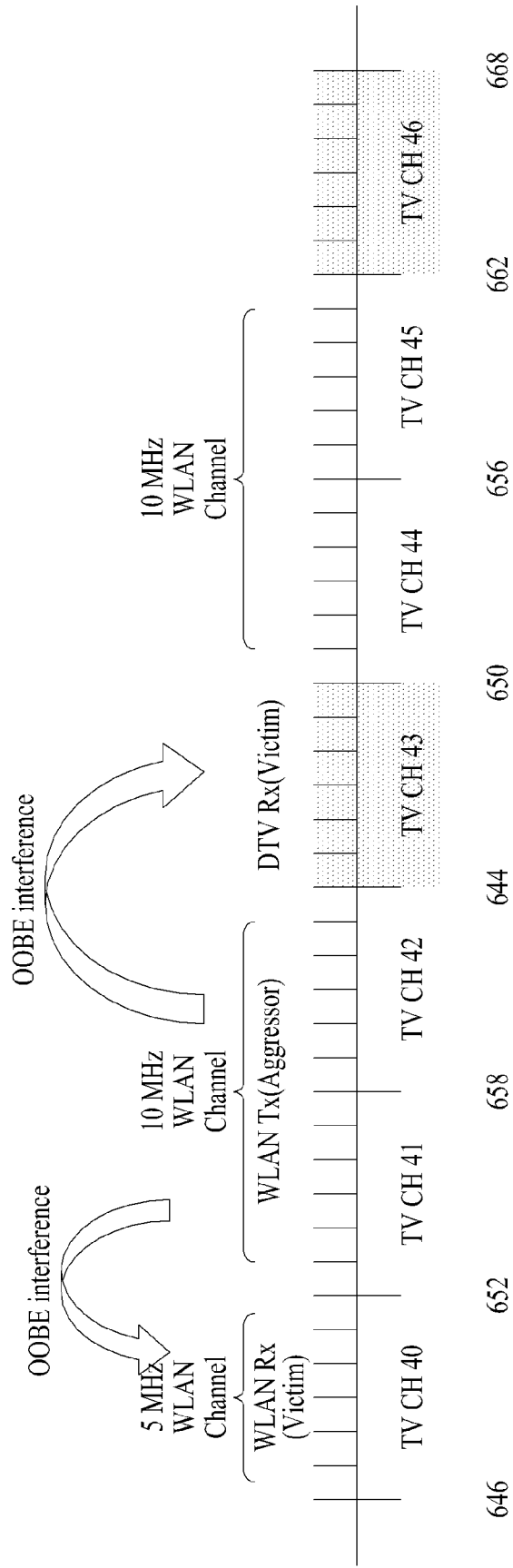
FIG. 18 is a diagram for one example to describe influence of interference caused by WLAN or LTE/LTE-A transmission when a WLAN or LTE/LTE-A service and a DTV service coexist.

FIG. 18 is a diagram for one example to describe influence of interference caused by WLAN or LTE/LTE-A transmission when a WLAN or LTE/LTE-A service and a DTV service coexist.

Referring to FIG. 18, a DTV, which is a licensed device, uses a frequency bandwidth of 644~650 MHz and a frequency bandwidth 662~668 MHz on a DTV receiving band as Channel 43 and Channel 46, respectively. According to IEEE 802.11a Standard, a WLAN user equipment supports at least one of 5 MHZ, 10 MHz and 20 MHz. If not supporting carrier aggregation, an LTE/LTE-A user equipment supports one of 6 channel bandwidths including 1.4 MHz, 3 MHz, 5 MHz, 10 MHz, 15 MHz, 20 MHz and the like. If supporting carrier aggregation, the LIE/LTE-A user equipment can theoretically support bandwidths up to 100 MHz. Yet, considering bandwidths actually secured by a service provider, the LTE/LTE-A user equipment can occupy bandwidths up to about 40 MHz. Depending on how many TV WS channels are not used contiguously by a licensed device, the LTE/LTE-A user equipment can support frequency bandwidths of 5 MHz and 10 MHz and higher bandwidths using 5 MHz as a basic bandwidth. In the example shown in FIG. 18, on Channel 40, the WLAN or LTE/LTE-A user equipment uses a frequency band of 5 MHz and is operating in receiving mode. And, on Channel 41 or Channel 42, the WLAN or LTE/LTE-A user equipment uses a frequency band of 10 MHz and is operating in transmitting mode.

In doing so, as mentioned in the foregoing description, if the WLAN or LTE/LTE-A user equipment coexists with a DTV receiving service without the help of a front-end filter, interference may affect a reception of a DTV receiver or a reception of another WLAN or LTE/LTE-A user equipment due to the out-of-band emission (OOBE) caused by a transmission of the WLAN or LTE/LTE-A user equipment. In the example shown in FIG. 18, the out-of-band emission (OOBE) caused by a transmission of the WLAN or LTE/LTE-A user equipment operating in transmitting mode on Channel 41 and Channel 42 causes interference to a reception of the LTE/LTE-A user equipment operating in receiving mode on Channel 40 or a reception of the DTV receiver on Channel 43. This influence of the interference can be regarded as mainly caused by ACLR (adjacent channel leakage ratio) corresponding to the output-of-band emission property for an adjacent band used by the WLAN or LTE/LTE-A user equipment, ACS (adjacent channel selectivity) for enabling a receiving end to receive its signal reliably in case of a presence of interference on an adjacent band, IM (inter-modulation) having at least two interference signals affect a receiving band, and the like.

Figure 19:
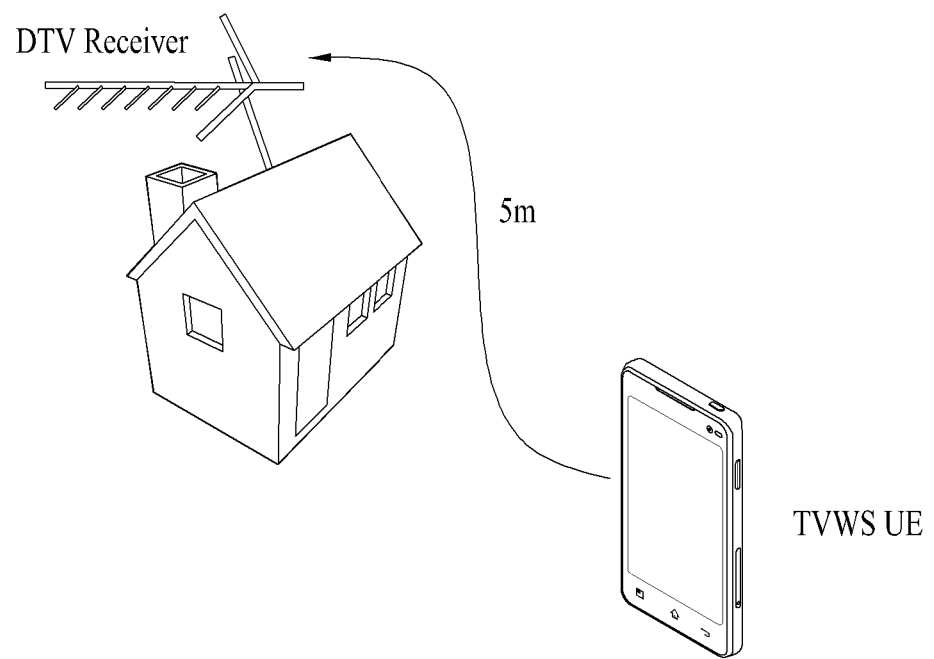
FIG. 19 is a diagram for one example that interference occurs in a DTV reception by a wireless LAN or LTE/LTE-A user equipment operating on TV WS band.

FIG. 19 is a diagram for one example that interference occurs in a DTV reception by a wireless LAN or LTE/LTE-A user equipment operating on TV WS band.

Referring to FIG. 19, a WLAN or LTE/LTE-A user equipment operating on TV WS band, which is spaced apart from a DTV receiver in a distance of about 5 m, causes interference to the DTV receiver by the output-of-band emission. In this situation, a link budget between the WLAN or LTE/LTE-A user equipment and the DTV receiver can be calculated as Table 1.

Table 1 shows one example of a link budget between a WLAN user equipment and a DTV receiver.

TABLE 1

| Parameter | Values | Notes |
| --- | --- | --- |
| Tx Power | 16 dBm/5 MHz | WLAN Tx max power |
| Distance to DTV receiver | 5 m | Distance from TVWS WLAN UE to victim DTV receiver |
| Antenna isolation | 57 dB | Free space loss is assumed |

TABLE 1-continued

| Parameter | Values | Notes |
| --- | --- | --- |
| Received pwr at DTV receiver | −41 dBm/5 MHz | Interference level in DTV receiver block |

For instance, assuming that a WLAN or LTE/LTE-A user equipment operating on a TV WS band performs a transmission by 16 dBm, an interference level affecting a DTV receiver spaced apart from the WLAN or LTE/LTE-A user equipment in a distance of 5 m can be come about 141 dBm/5 MHz in consideration of antenna isolation. In this case, the antenna isolation corresponding to power attenuation from a transmitting end antenna port to a receiving end antenna port is a value that can be changed by various factors including an antenna gain, a cable loss, a path loss model (e.g., a free space model, Hata model, etc.), a body loss and the like. Hence, it is able to calculate the antenna isolation using frequency and related values depending on whether a used service is a WLAN service or a cellular service such as LTE/LTE-A and WCDMA. Table 1 shows one example of assuming the antenna isolation as the free space model.

FIG. 20 is a diagram for one example of influence on DTV reception due to wireless LAN or LTE-LTE-A user equipment transmission ACLR, DTV reception ACS and the like.

Referring to FIG. 20, a DTV (i.e., a primary user) is affected by an output-of-band emission (OOBE) (e.g., ACLR, SEM (spectral emissions mask, etc.)) of a WLAN or LTE/LTE-A user equipment and the like. In the example shown in FIG. 20, interference is caused to a reception of a DTV operating in receiving mode on an adjacent channel by an output-of-band emission generated from a transmission of a WLAN or LTE/LTE-A user equipment operating in transmitting mode using a frequency band of 10 MHz on Channel 44 and Channel 35.

In the drawing, assuming that a DTV reception signal is about −74~−85 dBm, that ACRR (Adjacent Channel Rejection Ratio) of a DTV is set to 'DTV=−74 dBm' and that interference by a WLAN or LTE/LTE-A user equipment (=−41 dBm) is about 33 dB, since an IF (intermediate frequency) end cut-off property is about 40 dB actually, an additional power attenuation should be applied to a DTV receiving band value. In particular, this means that a transmission power of the WLAN or LTE/LTE-A user equipment or the like should be backed off by 4 dB at least.

Thus, it is highly probable that the out-of-band emission (OOBE) caused by a transmission of a WLAN or LTE/LTE-A user equipment or the like on TV WS band affects performance of a DTV receiver in various ways. In order to solve this problem, in case that a WLAN user equipment of an LTE/LTE-A user equipment operated on an unlicensed band such as a DTV receiving band and the like without a help of a front-end filter, the present invention proposes a method of controlling a transmission power of a user equipment for controlling interference leaking out of a band in order to protect a reception performance of a licensed device such as a DTV receiver and the like.

3.1. 1$^{st}$ Embodiment

FIG. 21 is a diagram for one example of a method of controlling a transmission power of a user equipment to minimize interference emitted to an adjacent band according to one embodiment of the present invention.

Referring to FIG. 21, a base station checks whether a receiving channel exists on an adjacent band of an available frequency band assigned to a user equipment [S2101]. In this case, the available frequency band assigned to the user equipment may include at least one unit channel of a corresponding unlicensed band (e.g., a DTV receiving band).

The base station is able to check whether the receiving channel exists on the adjacent band of the available frequency band assigned to the user equipment in a manner of receiving information determined by a network on the basis of a database from the network or using information shared with an adjacent base station. Alternatively, the base station can check whether the receiving channel exists on the adjacent band of the available frequency band assigned to the user equipment by receiving information on the adjacent band of the available frequency band assigned to the user equipment from the corresponding user equipment [not shown in FIG. 21]. Moreover, the base station can determine whether the receiving channel exists on the adjacent band of the available frequency band assigned to the user equipment in a manner of combining at least one of the above-mentioned schemes of the determination with each other.

First of all, a method of determining whether the receiving channel exists on the adjacent band of the available frequency band assigned to the user equipment by the network on the basis of the database is described as follows. First of all, the base station is able to check a frequency used by a licensed device on the corresponding unlicensed band using the database. For instance, in case of TV WS band, the network is able to check a frequency assigned to a DTV receiver in an area serviced by the corresponding network. As mentioned in the foregoing description, the TV WS band may differ in each country and the network is able to check the information on a frequency band assigned to a DTV receiver in a corresponding area. Thus, the base station receives the information determined on the basis of the database from the network and is then able to check whether the receiving channel exists on the adjacent band of the available frequency band assigned to the user equipment.

Moreover, each base station on a network is able to check usage information of an unlicensed device except a licensed device on an adjacent band of an available frequency band assigned by the corresponding base station to a user equipment in a service (e.g., a cell, a BSA, etc.) serviced by the corresponding base station. And, the base station is able to check whether the adjacent band is used in a manner of sharing the usage information with other base stations per frequency band. For instance, in case of TV WS band, a base station can check whether an unlicensed device such as a WLAN user equipment, an LTE/LTE-A user equipment and the like other than a DTV receiver is using an adjacent band through the information shared with an adjacent base station.

Besides, a user equipment detects whether a receiving channel of a licensed or unlicensed device exists on an adjacent band of an available frequency band assigned to the corresponding user equipment and is then able to transmit the information on the receiving channel detected from the adjacent band to a base station. For instance, the user equipment measures a power in a manner of scanning x adjacent bands with reference to the available frequency band assigned to the corresponding user equipment in the whole DTV receiving band and is then able to check whether another device is performing a receiving service on the adjacent band by comparing the measured power value to a reference value for a receiving area. In doing so, the user equipment can perform a frequency scan per basic frequency unit on a corresponding unlicensed band and the number of the adjacent bands to be scanned can be set in advance. If the power measurement value is greater than a specific threshold Th-low [dBm], the user equipment may determine that another device is performing the receiving service on the adjacent band. Alternatively, if the power measurement value is smaller than a specific threshold Th-high [dBm], the user equipment may determine that another device is performing the receiving service on the adjacent band. Besides, if the power measurement value lies in a specific range (e.g., between Th-low [dBm] and Th-high [dBm]), the user equipment may determine that another device is performing the receiving service on the adjacent band. In this case, the reference value for the receiving area may differ for each service provided on the corresponding unlicensed band. For instance, the reference value for the receiving area may differ in accordance with a service band such as a DTV receiving band, an ISM (industrial scientific and medical equipment) band and the like. Thus, the base station is able to determine whether the receiving channel exists on the adjacent band of the available frequency band assigned to the user equipment in a manner that the user equipment detects whether the receiving channel exists on the adjacent band of the available frequency band assigned to the corresponding user equipment and then sends the detected information to the base station. In particular, the information for determining whether a receiving band of another device exists on the adjacent band, which is transmitted to the base station by the user equipment, means the information indicating whether the value of the measurement on the power on the adjacent band belongs to a range of a preset reference value.

Having determined that the receiving channel exists on the adjacent band of the available frequency band assigned to the user equipment, the base station transmits transmission power control information to the user equipment in order to control a transmission power of the user equipment [S2103]. In this case, the transmission power control information means the information for the base station to correct (or attenuate) a transmission power of the user equipment with reference to a level of interference enough not to affect a reception on the adjacent band of the available frequency band assigned to the user equipment due to the transmission power of the user equipment.

For example, the transmission power control information may include a maximum transmission possible power value of the user equipment calculated by the base station with reference to the level of the interference enough not to affect the reception on the adjacent band. In this case, the calculated maximum transmission possible power value may differ for each available frequency band (or an available channel) assigned to the user equipment. The transmission power control information may include a parameter value used to calculate the maximum transmission possible power value in order for the user equipment to calculate the maximum transmission possible power value or a difference between a current maximum transmission possible power value of the user equipment and the calculated maximum transmission possible power value.

Meanwhile, although a maximum transmission power of a user equipment in an existing LTE is determined in accordance with a power class to which the user equipment belongs, a power reduction is additionally allowed depending on a modulation order of a baseband end on transmission, a resource block (RB) size or a type of an operating band having a user equipment belong thereto without using a maximum power corresponding to the power class of the user equipment as it is. And, it is able to control the additional power reduction using MPR (maximum power reduction), A-MPR (additional MPR) and the like.

The base station may transmit the above-mentioned A-MPR (additional MPR) value (or table) as the transmission power control information to the user equipment. And, the base station may transmit a network signaling (NS) related to a transmission power control to the user equipment. In this case, the network signaling sent by a base station or network may include an operation in a format previously agreed to enable a user equipment to perform a predetermined transmission power control by itself in consideration of regulation of a specific area in which the user equipment has registered. Alternatively, if the base station or network sends a network signaling suitable for a situation to the user equipment by dynamically considering various cases depending of a surrounding channel situation, the user equipment can perform a transmission power control of a type differing in accordance with the received network signaling. Moreover, the base station or network assigns a network signaling dedicated to a corresponding service band (e.g., TV WS band) and is then able to send the assigned network signaling (NS_xx) to the user equipment. The user equipment can correct the transmission power of the user equipment using a table A-MPR$_{xx}$ associated with the received NS_xx. In this case, the A-MPR$_{xx}$ can include an integrated table capable of protecting LTE/LTE-A, DTV and WLAN receivers all through RF (radio frequency) simulation or the like.

The base station can transmit the above-mentioned transmission power control information as SIB (system information block) and is able to use upper layer signaling (e.g., RRC signaling) or a control channel (e.g., PDCCH, etc.).

Having received the transmission power control information from the base station, the user equipment corrects the transmission power of the user equipment using the received transmission power control information [S2105]. For instance, if the user equipment receives the maximum transmission possible power value from the base station, the received maximum transmission possible power value can be substituted with a maximum transmission possible power value allowed for the user equipment. In case of receiving parameter information for calculating a maximum transmission possible power value from the base station, it is able to calculate a maximum transmission possible power value allowed for the user equipment using the received parameter. Moreover, it the user equipment receives the difference between a current maximum transmission possible power value of the user equipment and the calculated maximum transmission possible power value, it is able to calculate a maxim transmission possible power value using the maximum transmission possible power value allowed for the user equipment. Besides, in case of receiving A-MPR or NS, it is able to correct a maximum transmission power using the corresponding A-MPR.

3.2. 2$^{nd}$ Embodiment

FIG. 22 is a diagram for one example of a method of controlling a transmission power of a user equipment to minimize interference emitted to an adjacent band according to one embodiment of the present invention.

Referring to FIG. 22, a user equipment checks whether a receiving channel exists on an adjacent band of an available frequency band assigned to the corresponding user equipment [S2201]. In this case, the available frequency band assigned to the user equipment may include at least one unit channel of a corresponding unlicensed band (e.g., a DTV receiving band).

The user equipment can detect whether the receiving channel of a licensed or unlicensed device exists on the adjacent band by performing frequency scan on the adjacent band of the available frequency band assigned to the corresponding user equipment. Moreover, it is able to check whether the receiving channel exists on the adjacent band of the available frequency band assigned to the corresponding user equipment by a network by receiving information determined on the basis of a database or information shared between base stations belonging to the network. Since the process for the user equipment or network to check whether the receiving channel exists on the adjacent band of the available frequency band assigned to the user equipment are identical to the former process of the embodiment described with reference to FIG. 21, its details shall be omitted from the following description.

Having determined that the receiving channel exists on the adjacent band of the available frequency band assigned to the corresponding user equipment, the user equipment corrects a transmission power [S2203]. In particular, the user equipment calculates a maximum transmission possible power value by itself with reference to a level of interference enough not to affect a reception on the adjacent band and then corrects the transmission power based on the calculated maximum transmission power value. Thus, the maximum transmission power value of the user equipment, which is calculated by the user equipment, may differ depending on the implemented RF transmission performance of the corresponding user equipment or the like, and more particularly, per available frequency band (or available channel) assigned to the user equipment.

Having corrected the transmission power, the user equipment transmits information on the corrected transmission power to the base station [S2205]. In this case, the transmission power correction information of the user equipment, which is transmitted by the user equipment, may become the maximum transmission power value calculated in the step S2203 by the user equipment or a difference between the maximum transmission power value of the user equipment before the correction and the maximum transmission power value calculated in the step S2203. Thus, as the user equipment transmits the transmission power correction information to the base station, the base station can use the transmission power correction information of the corresponding user equipment in allocating resources to the corresponding user equipment, thereby raising efficiency in the resource allocation of the base station.

4. The General of Invention Applicable Devices

Figure 23:
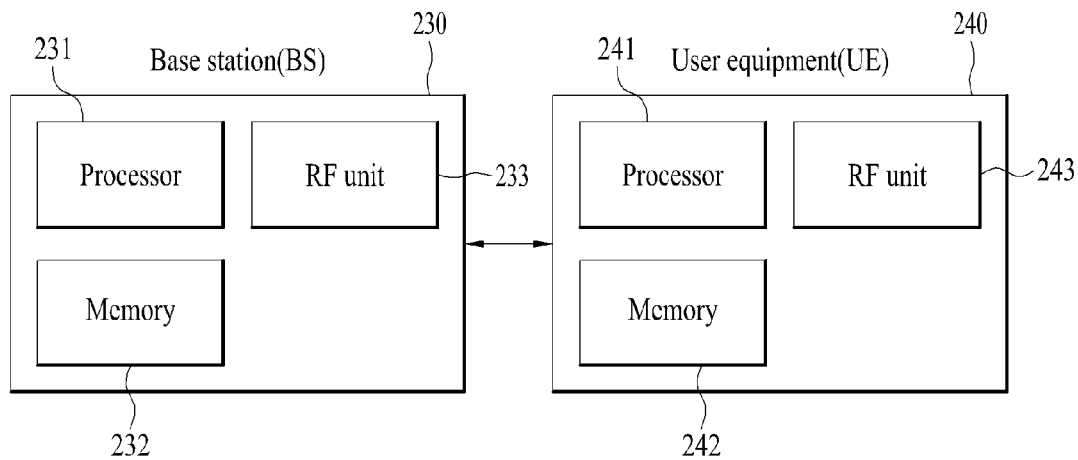
FIG. 23 is a block diagram for a configuration of a wireless communication device according to one embodiment of the present invention.

FIG. 23 is a block diagram for a configuration of a wireless communication device according to one embodiment of the present invention.

Referring to FIG. 23, a wireless communication system includes a base station 230 and a plurality of user equipments 240 located in an area of the base station 230.

The base station 230 includes a processor 231, a memory 232 and an RF (radio frequency) unit 233. The processor 231 implements the functions, processes and/or methods proposed by the present invention. Layers of a radio interface protocol can be implemented by the processor 231. The memory 232 is connected to the processor 231 and stores various kinds of information for driving the processor 231. The RF unit 233 is connected to the processor 231 and then transmits and/or receives radio signals.

The user equipment 240 includes a processor 241, a memory 242 and an RF (radio frequency) unit 243. The processor 241 implements the functions, processes and/or methods proposed by the present invention. Layers of a radio interface protocol can be implemented by the processor 241. The memory 242 is connected to the processor 241 and stores various kinds of information for driving the processor 241. The RF unit 243 is connected to the processor 241 and then transmits and/or receives radio signals.

The memory 232/242 may be included inside or outside the processor 231/241 and then connected to the processor 231/241 via a means known well to the public. Optionally, the base station 230 and/or the user equipment 240 may have a single antenna or multiple antennas.

In the following description, the processor 231/241 of the base station/user equipment is explained in detail. The processor 231/241 may have a multi-layer structure. In these layers, particularly, a MAC sublayer in a data link layer (DLL) and a physical layer shall be illustrated in detail.

Figure 24:
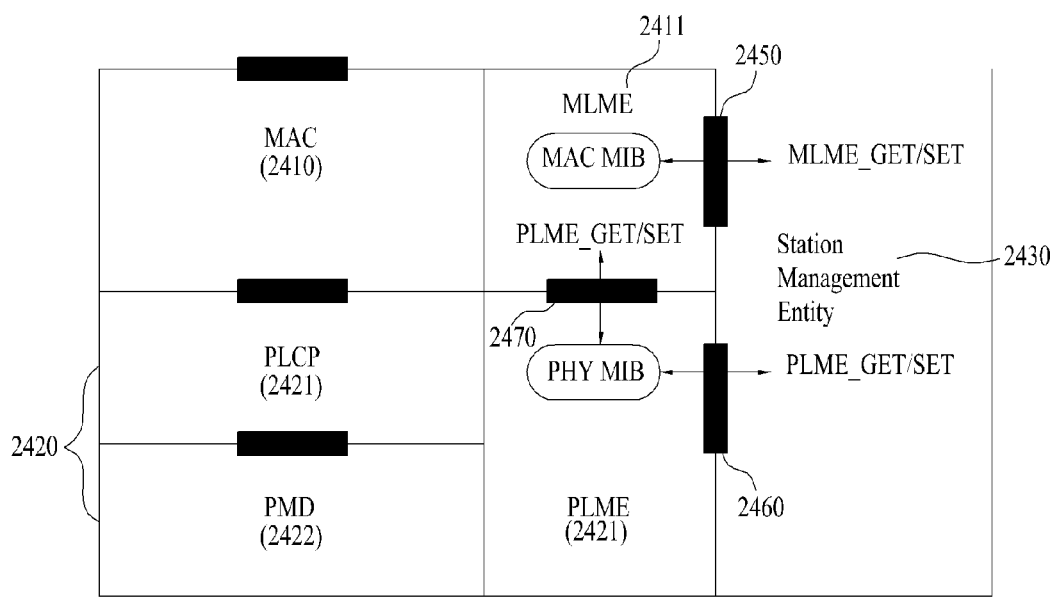
FIG. 24 is a diagram for one example of a processor structure of a base station or user equipment according to one embodiment of the present invention.

FIG. 24 is a diagram for one example of a processor structure of a base station or user equipment according to one embodiment of the present invention.

Referring to FIG. 24, a physical layer 2420 can include a PLCP entity (Physical Layer Convergence Procedure Entity) 2421 and a PMD entity (Physical Medium Dependent Entity) 2422. Both a MAC sublayer 2410 and a physical layer 2420 can include conceptional management entities that can be named MLME (MAC Sublayer Management Entity) 2411 and PLME (Physical Layer Management Entity) 2423, respectively. These entities 2411 and 2421 provide a layer management service interface through an operation of a layer management function.

In order to provide an accurate MAC operation, SME (Station Management Entity) 2430 may exist in each user equipment. The SME 2430 is a management entity independent from each layer and collects layer based state information from various layer management entities or sets values of specific parameters of the respective layers. The SME 2430 can perform such a function instead of general system management entities and can implement a standard management protocol.

The above-mentioned various entities can mutually interact with each other in various ways. In the example shown in FIG. 24, a GET/SET primitive is exchanged. A primitive XX-GET.request is used to request a value of MIB attribute (management information base attribute. If a state is 'SUCCESS', a primitive XX-GET.confirm returns a value of the corresponding MIB attribute. In other cases, an error indication is marked on a state field and then returned. A primitive XX-SET.request is used to make a request for setting a designated attribute a s a given value. If the MIB attribute mea ns a specific operation, this request makes a request for executing the corresponding specific operation. If a state is 'SUCCESS', a primitive XX-SET.confirm means that the designated MIB attribute is set to the requested value. In other cases, a state field indicates an erroneous situation. If this MIB attribute means a specific operation, the corresponding primitive can confirm that the corresponding operation has been performed.

Referring to FIG. 24, the MLME 2411, the SME 2430, the PLME 2423 and the SME 2430 can exchange the above-mentioned various primitives through MLME_SAP (MLME_Service Access Point) 2450, PLME_SAP (PLME_Service Access Point) 2460. And, the MLME 2411 and the PLME 2423 can exchange primitives through MLME-PLME_SAP (MLME-PLME_Service Access Point) 2470.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A data transceiving method in a wireless access system according to the present invention is mainly described with reference to the examples of applying to 3GPP LTE system and IEEE 802 system and may be applicable to various kinds of wireless access systems.

What is claimed is:

1. A method for controlling a transmission power of a user equipment by a base station in a wireless communication system supportive of an unlicensed frequency band, the method comprising:

assigning, by the base station to the user equipment, a frequency band unused by a licensed device in the unlicensed frequency band;

receiving, by the base station from the user equipment, information indicating whether a power measured by the user equipment on a frequency band adjacent to the assigned frequency band has a value between a first threshold value and a second threshold value;

determining, by the base station based on the received information, whether a receiving frequency band of another device exists adjacent to the assigned frequency band, wherein when the power measured by the user equipment on the adjacent frequency band has the value between the first threshold value and the second threshold value, the receiving frequency band of the another device exists adjacent to the assigned frequency band, and wherein when the power measured by the user equipment on the adjacent frequency band has a value other than the value between the first threshold value and the second threshold value, the receiving frequency band of the another device does not exist adjacent to the assigned frequency band;

calculating, by the base station, a maximum transmission power value of the user equipment based on a level of interference which does not affect receiving by another device on the receiving frequency band of the another device, when the receiving frequency band of the another device exists adjacent to the assigned frequency band; and transmitting, by the base station to the user equipment, transmission power control information for correcting a transmission power of the user equipment based on the calculated maximum transmission power value.

2. The method of claim 1, further comprising:
receiving, from a network, information indicating whether the receiving frequency band of the another device exists adjacent to the assigned frequency band.

3. The method of claim 1, further comprising:
determining whether the receiving frequency band of the another device exists adjacent to the assigned frequency band, through usage information of the unlicensed frequency band shared with another base station.

4. The method of claim 1, wherein the transmission power control information comprises A-MPR (Additional Maximum Power Reduction).

5. A method for controlling a transmission power by a user equipment in a wireless communication system supportive of an unlicensed frequency band, the method comprising:
configuring, by the user equipment, a frequency band unused by a licensed device in the unlicensed frequency band, the frequency band being assigned by a base station;
transmitting, by the user equipment to the base station, information indicating whether a power measured by the user equipment on a frequency band adjacent to the assigned frequency band has a value between a first threshold value and a second threshold value,
wherein when the power measured by the user equipment on the adjacent frequency band has the value between the first threshold value and the second threshold value, a receiving frequency band of another device exists adjacent to the assigned frequency band, and
wherein when the power measured by the user equipment on the adjacent frequency band has a value other than the value between the first threshold value and the second threshold value, the receiving frequency band of the another device does not exist adjacent to the assigned frequency band;
receiving, by the user equipment from the base station, transmission power correction information indicating a maximum transmission power value of the user equipment,
wherein the maximum transmission power value is calculated by the base station based on a level of interference which does not affect receiving by the another device on the receiving frequency band of the another device, when the receiving frequency band of the another device exists adjacent to the configured frequency band; and
correcting, by the user equipment, a transmission power of the user equipment based on the received transmission power correction information.

6. The method of claim 5, further comprising:
determining whether the receiving frequency band of the another device exists adjacent to the assigned frequency band by performing a frequency scan on the receiving frequency band of the another device.

7. The method of claim 5, wherein the maximum transmission power value is calculated in consideration of performance of a RF (radio frequency) unit of the user equipment.

8. A base station configured to operate in a wireless communication system supportive of an unlicensed frequency band, the base station comprising:
a radio frequency (RF) unit configured to transceive a wireless signal; and
a processor configured to:
assign, to a user equipment, a frequency band unused by a licensed device in the unlicensed frequency band,
control receiving, from the user equipment, information indicating whether a power measured by the user equipment on a frequency band adjacent to the assigned frequency band has a value between a first threshold value and a second threshold value,
determine, based on the received information, whether a receiving frequency band of another device exists adjacent to the assigned frequency band,
wherein when the power measured by the user equipment on the adjacent frequency band has the value between the first threshold value and the second threshold value, the receiving frequency band of the another device exists adjacent to the assigned frequency band, and
wherein when the power measured by the user equipment on the adjacent frequency band has a value other than the value between the first threshold value and the second threshold value, the receiving frequency band of the another device does not exist adjacent to the assigned frequency band,
calculate a maximum transmission power value of the user equipment based on a level of interference which does not affect receiving by the another device on the receiving frequency band of the another device, when the receiving frequency band of the another device exists adjacent to the assigned frequency band, and
control transmitting, to the user equipment, transmission power control information for correcting a transmission power of the user equipment based on the calculated maximum transmission power value.

9. A user equipment configured to operate in a wireless communication system supportive of an unlicensed frequency band, the user equipment comprising:
a radio frequency (RF) unit configured to transceive a wireless signal; and
a processor configured to:
configure a frequency band unused by a licensed device in the unlicensed frequency band, the frequency band being assigned by a base station, control transmitting, to the base station, information indicating whether a power measured by the user equipment on a frequency band adjacent to the assigned frequency band has a value between a first threshold value and a second threshold value, wherein when the power measured by the user equipment on the adjacent frequency band has the value between the first threshold value and the second threshold value, a receiving frequency band of another device exists adjacent to the assigned frequency band, and wherein when the power measured by the user equipment on the adjacent frequency band has a value other than the value between the first threshold value and the second threshold value, the receiving frequency band of the another device does not exist adjacent to the assigned frequency band, control receiving, from the base station, transmission power correction information indicating a maximum transmission power value of the user equipment, wherein the maximum transmission power value is calculated by the base station based on a level of interference which does not affect receiving by another device on the receiving frequency band of the another device, when the receiving frequency band of the another device exists adjacent to the assigned frequency band, and correct a transmission power of the user equipment based on the received transmission power correction information.

10. The method of claim 1, wherein the transmission power control information is transmitted using radio resource control (RRC) signaling.

11. The method of claim 1, wherein the transmission power control information is transmitted using a physical downlink control channel (PDCCH).

12. The method of claim 1, wherein correcting the transmission power of the user equipment includes configuring a maximum transmission power of the user equipment by the maximum transmission power value indicated by the received transmission power control information.

13. The method of claim 5, wherein the transmission power correction information is received using radio resource control (RRC) signaling.

14. The method of claim 5, wherein the transmission power correction information is received using a physical downlink control channel (PDCCH).

15. The method of claim 5, wherein correcting the transmission power of the user equipment includes configuring, by the user equipment, a maximum transmission power of the user equipment by the maximum transmission power value indicated by the received transmission power correction information.

* * * * *